United States Patent
Kim

(10) Patent No.: US 11,288,669 B1
(45) Date of Patent: Mar. 29, 2022

(54) FRICTIONLESS TOKEN BASED BLOCKCHAIN

(71) Applicant: Project Noa Inc., Miami, FL (US)

(72) Inventor: Paul Dohyung Kim, Miami, FL (US)

(73) Assignee: PROJECT NOA, INC., Miami, FL (US)

( * ) Notice: Subject to any disclaimer, the term of this patent is extended or adjusted under 35 U.S.C. 154(b) by 0 days.

(21) Appl. No.: 17/240,889

(22) Filed: Apr. 26, 2021

Related U.S. Application Data

(63) Continuation-in-part of application No. 17/219,239, filed on Mar. 31, 2021, which is a continuation-in-part of application No. 17/115,337, filed on Dec. 8, 2020.

(51) Int. Cl.
| | |
|---|---|
| *G06Q 40/00* | (2012.01) |
| *G06Q 20/40* | (2012.01) |
| *G06Q 20/38* | (2012.01) |
| *G06N 20/00* | (2019.01) |
| *G06F 16/29* | (2019.01) |

(52) U.S. Cl.
CPC .......... *G06Q 20/401* (2013.01); *G06F 16/29* (2019.01); *G06N 20/00* (2019.01); *G06Q 20/382* (2013.01); *G06Q 20/389* (2013.01); *G06Q 2220/00* (2013.01)

(58) Field of Classification Search
CPC .. G06Q 20/401; G06Q 20/382; G06Q 20/389; G06N 20/00; G06F 16/29
See application file for complete search history.

(56) References Cited

U.S. PATENT DOCUMENTS

| | | |
|---|---|---|
| 7,385,529 B2 | 6/2008 | Hersh et al. |
| 8,930,472 B2 | 1/2015 | Leacock et al. |
| 9,002,721 B2 | 4/2015 | Hughes |
| 9,225,676 B1 | 12/2015 | Shoham et al. |
| 9,400,975 B2 | 7/2016 | Griffin et al. |

(Continued)

FOREIGN PATENT DOCUMENTS

| | | | | |
|---|---|---|---|---|
| WO | WO-2018060951 A | * | 4/2018 | ........... G06Q 20/065 |
| WO | WO-2020209409 A1 | * | 10/2020 | ............. G06Q 20/06 |
| WO | WO-2021101108 A1 | * | 5/2021 | ............. G06Q 20/06 |

OTHER PUBLICATIONS

Rueegger et al., "Rational Exchange: Incentives in Atomic Cross Chain Swaps," 978-1-7281-6680-3/20, IEEE, 2020. (Year: 2020).*

(Continued)

*Primary Examiner* — Alexander G Kalinowski
*Assistant Examiner* — William B. Bunker
(74) *Attorney, Agent, or Firm* — Kwan & Olynick LLP

(57) ABSTRACT

Described herein is a relationship based fulfillment system. Such a system may provide on-demand product fulfillment by personal and/or social contacts of a purchaser. The system may utilize the personal contacts and/or relationships of a user, as indicated through various contact databases or social groups of the user, to connect the user to various potential partners for providing relationship based fulfillment of products that are purchased by the user or performance of other relationship based services. Furthermore, the system described herein may allow for the utilization of one or more currencies, such as cryptocurrencies, within the system. Techniques are described herein to allow for the utilization of such currencies in a resource efficient manner.

16 Claims, 23 Drawing Sheets

(56) References Cited

U.S. PATENT DOCUMENTS

| | | |
|---|---|---|
| 9,916,557 B1 | 3/2018 | Gillen et al. |
| 9,928,540 B1 | 3/2018 | Gerard et al. |
| 10,380,535 B1* | 8/2019 | Arora .................... G06Q 50/12 |
| 10,902,416 B1* | 1/2021 | McNamara .......... G06Q 20/065 |
| 2013/0253969 A1 | 9/2013 | Das et al. |
| 2014/0149244 A1* | 5/2014 | Abhyanker ............ G06Q 10/10 705/26.2 |
| 2014/0297743 A1 | 10/2014 | Zyto et al. |
| 2015/0178312 A1 | 6/2015 | Pant et al. |
| 2015/0278892 A1* | 10/2015 | Roy .................. G06Q 30/0611 705/26.4 |
| 2015/0363769 A1* | 12/2015 | Ronca .................... G06Q 40/04 705/64 |
| 2016/0063435 A1 | 3/2016 | Shah et al. |
| 2016/0247105 A1 | 8/2016 | Vaze et al. |
| 2017/0293898 A1* | 10/2017 | Rampton ............ G06Q 20/382 |
| 2018/0041446 A1* | 2/2018 | Way ........................ G06Q 40/04 |
| 2019/0347628 A1* | 11/2019 | Al-Naji .............. G06Q 20/3678 |
| 2019/0347743 A1* | 11/2019 | Ponce .................. G06Q 10/083 |
| 2019/0356641 A1* | 11/2019 | Isaacson .............. G06Q 20/384 |
| 2021/0133855 A1* | 5/2021 | Ramirez ................ G06Q 50/12 |
| 2021/0192501 A1* | 6/2021 | McNamara ........... H04L 69/329 |

OTHER PUBLICATIONS

Zima, "P2P Cryptocurrency Exchange and Blockchain Size Reduction," PhD Thesis, Masaryk University, Faculty of Informatics, 2017. (Year: 2017).*

U.S. Appl. No. 17/115,337, Advisory Action dated Aug. 5, 2021, 3 pgs.

U.S. Appl. No. 17/115,337, Examiner Interview Summary dated Apr. 2, 2021, 2 pgs.

U.S. Appl. No. 17/115,337, Final Office Action dated Apr. 30, 2021, 9 pgs.

U.S. Appl. No. 17/115,337, Non-Final Office Action dated Feb. 10, 2021, 38 pgs.

U.S. Appl. No. 17/115,337, Notice of Allowance dated Sep. 21, 2021, 9 pgs.

U.S. Appl. No. 17/219,239, Examiner Interview Summary dated Sep. 17, 2021, 2 pgs.

U.S. Appl. No. 17/219,239, Non-Final Office Action dated Jun. 21, 2021, 55 pgs.

* cited by examiner

|  | User 1302 | User 1304 | User 1306 | User 1308 | User 1310 |
|---|---|---|---|---|---|
| Starting Week 1 | 0 | 0 | 0 | 20 | 0 |
| Week 1 In | 10 | 0 | 0 | 10 | 0 |
| Week 1 Earned | 35 | 25 | 30 | 0 | 10 |
| Week 1 Consumed | 0 | 5 | 10 | 10 | 10 |
| Startin Week 2 | 45 | 20 | 20 | 20 | 0 |
| Week 2 In | 0 | 10 | 0 | 0 | 0 |
| Week 2 Earned | 35 | 20 | 20 | 0 | 0 |
| Week 2 Consumed | 40 | 20 | 15 | 5 | 25 |
| Starting Week 3 | 40 | 30 | 25 | 15 | 35 |

*FIG. 13*

FRICTIONLESS TOKEN BASED BLOCKCHAIN

CROSS-REFERENCE TO RELATED APPLICATION

This patent document is a continuation-in-part of and claims the benefit of priority under 35 U.S.C. § 120 of U.S. patent application Ser. No. 17/219,239, titled "Community Based Fulfillment," by Paul Kim, filed Mar. 31, 2021, which is a continuation-in-part of U.S. patent application Ser. No. 17/115,337, titled "Relationship Based Fulfillment Systems and Methods," by Paul Kim, filed Dec. 8, 2020, all of which are hereby incorporated by reference in their entirety for all purposes.

BACKGROUND

Orders placed through the internet continue to grow in volume. Fulfillment of such orders is typically through a fulfillment center hub that provides goods for delivery of ordered items. Such fulfillment hubs are centralized, require complicated inventory tracking techniques in order to operate efficiently, and costly. The cost and complexity of operating such fulfillment systems results in only a few large companies being able to afford the scale and complexity of such fulfillment models.

Blockchain based currencies, such as cryptocurrencies of which examples include Bitcoin and Ethereum, have traditionally incurred high transaction barriers. For example, transaction fees for cryptocurrencies are dependent upon computational complexity that require thousands of machines to validate transactions, bandwidth use, and storage needs, and other such factors. Such barriers make traditional cryptocurrencies unsuitable for transactions.

SUMMARY

Described are methods and systems for coin based community/relationship based fulfillment. In a certain embodiment, a system may be provided. The system may include a gateway, communicatively coupled to a network, a location module, configured to receive location data from user devices of user members, a coin module, configured to store a coin blockchain and a coin ledger, and a processor, communicatively coupled to the gateway, the location module, and the coin module. The processor may be configured to perform operations including receiving, with the gateway and from a first user device associated with a first user, a first fulfillment request associated with a first transaction, where the first fulfillment request includes a standardized coin compensation of a platform coin, matching, with the processor, a second user to the first fulfillment request, where the second user is associated with a second user device, providing, with the gateway to the second user device, first pick-up data including a first token including the first fulfillment request, receiving, with the gateway, a first fulfillment acceptance from the second user device, determining, with the processor, that the first fulfillment acceptance indicates the standardized coin compensation, receiving, with the gateway from the second user device, completion data including a first updated token, where the first updated token includes the first fulfillment request and a completion indication, determining, with the processor from the first updated token, that the first fulfillment request has been performed, allocating, with the coin module on the coin ledger and based on the determining that the first fulfillment request has been performed, the standardized coin compensation to the second user, determining, with the processor and based on the first fulfillment acceptance indicating the standardized coin compensation, that a blockchain record event has not been satisfied, receiving, with the gateway and from the second user, an exchange request for a first coin amount of the platform coin, providing, with the gateway to an exchange engine and based on the receiving the exchange request, an exchange rate request, receiving, with the gateway, exchange rate data from the exchange engine, determining, with the processor and based on the exchange rate data, an exchange rate for the platform coin, determining, with the processor, that the exchange rate is below a threshold rate, providing, with the gateway and based on the determining that the exchange rate is below the threshold rate, a backstop request to a backstop entity, receiving, with the gateway and from the backstop entity, a backstop confirmation, recording, on the coin ledger, an exchange based on the exchange request, determining, with the processor and based on the receiving the backstop confirmation, that the blockchain record event has been satisfied, and generating, with the coin module, a coin record associated with the exchange request on the coin blockchain.

In another embodiment, another system may be provided. The system may include a gateway, communicatively coupled to a network, a location module, configured to receive location data from user devices of user members, a coin module, configured to store a coin blockchain and a coin ledger, and a processor, communicatively coupled to the gateway, the location module, and the coin module. The processor may be configured to perform operations including receiving, with the gateway and from a first user device associated with a first user, a first fulfillment request associated with a first transaction, where the first fulfillment request includes a standardized coin compensation of a platform coin, matching, with the processor, a second user to the first fulfillment request, where the second user is associated with a second user device, providing, with the gateway to the second user device, first pick-up data including a first token including the first fulfillment request, receiving, with the gateway, a first fulfillment acceptance from the second user device, determining, with the processor, that the first fulfillment acceptance indicates the standardized coin compensation, receiving, with the gateway from the second user device, completion data including a first updated token, where the first updated token includes the first fulfillment request and a completion indication, determining, with the processor from the first updated token, that the first fulfillment request has been performed, allocating, with the coin module on the coin ledger and based on the determining that the first fulfillment request has been performed, the standardized coin compensation to a second user wallet account of the second user, determining, with the processor and based on the first fulfillment acceptance indicating the standardized coin compensation, that a blockchain record event has not been satisfied, receiving, with the gateway and from the second user device, a second transaction request, where the second transaction request includes a first coin amount and is associated with a merchant, transferring, with the coin module, the first coin amount from the second user wallet account to a merchant wallet account by recording the transfer within the coin ledger, determining, with the processor, that the second transaction request does not satisfy the blockchain record event, receiving, with the gateway and from the merchant, a redemption request for at least the first coin amount, recording, on the merchant wallet account of the coin ledger, a redemption for the at least the first coin amount, determining, with the processor and based on the receiving the redemption request, that the blockchain record event has been satisfied, and generating, with the coin module, a coin record associated with the redemption request on the coin blockchain.

In a further embodiment, a method may be provided. The method may include receiving, with a gateway and from a first user device associated with a first user, a first fulfillment request associated with a first transaction, where the first fulfillment request includes a standardized coin compensation of a platform coin, matching, with a processor, a second user to the first fulfillment request, where the second user is associated with a second user device, providing, with the gateway to the second user device, first pick-up data including a first token including the first fulfillment request, receiving, with the gateway, a first fulfillment acceptance from the second user device, determining, with the processor, that the first fulfillment acceptance indicates the standardized coin compensation, receiving, with the gateway from the second user device, completion data including a first updated token, where the first updated token includes the first fulfillment request and a completion indication, determining, with the processor from the first updated token, that the first fulfillment request has been performed, allocating, with a coin module on a coin ledger and based on the determining that the first fulfillment request has been performed, the standardized coin compensation to the second user, determining, with the processor and based on the first fulfillment acceptance indicating the standardized coin compensation, that a blockchain record event has not been satisfied, receiving, with the gateway and from the second user, an exchange request for a first coin amount of the platform coin, providing, with the gateway to an exchange engine and based on the receiving the exchange request, an exchange rate request, receiving, with the gateway, exchange rate data from the exchange engine, determining, with the processor and based on the exchange rate data, an exchange rate for the platform coin, determining, with the processor, that the exchange rate is below a threshold rate, providing, with the gateway and based on the determining that the exchange rate is below the threshold rate, a backstop request to a backstop entity, receiving, with the gateway and from the backstop entity, a backstop confirmation, recording, on the coin ledger, an exchange based on the exchange request, determining, with the processor and based on the receiving the backstop confirmation, that the blockchain record event has been satisfied, and generating, with the coin module, a coin record associated with the exchange request on a coin blockchain.

Illustrative, non-exclusive examples of inventive features according to the present disclosure are described herein. These and other examples are described further below with reference to figures.

BRIEF DESCRIPTION OF THE DRAWINGS

The disclosure may best be understood by reference to the following description taken in conjunction with the accompanying drawings, which illustrate various embodiments.

FIG. 13 is an example ledger for coin based community based fulfillment, in accordance with some embodiments.

DETAILED DESCRIPTION

In the following description, specific details are set forth to provide illustrative examples of the systems and techniques described herein. The presented concepts may be practiced without some, or all, of these specific details. In other instances, well known process operations have not been described in detail to avoid unnecessarily obscuring the described concepts. While some concepts will be described with the specific examples, it will be understood that these examples are not intended to be limiting.

Some embodiments of the disclosed systems, apparatus, methods and computer program products are configured for implementing relationship based fulfillment. As described in further detail below, such a system may provide an environment where on-demand product fulfillment is provided by personal and/or social contacts of a purchaser. The described techniques allow for resource efficient determination of appropriate personal and/or social contacts to provide for such fulfillment. In various embodiments, the techniques described herein may utilize the personal contacts and/or relationships of a user, as indicated through various contact databases or social groups of the user.

In certain embodiments, the disclosed systems, apparatus, methods and computer program products are configured to utilize cryptocurrency or a plurality of different currencies for transactions. Such currencies may be provided as compensation, as payment for purchases, and/or as portions of other transfers. The techniques described herein allow for frictionless transactions utilizing such currencies and for such currencies to be allocated, transferred, and/or exchanged in a resource efficient manner. For example, typical transactions that utilize cryptocurrencies require large amounts of processing and memory resources to record transfers, requesting in large transaction fees. The techniques described herein allow for cryptocurrency transactions in a memory efficient manner, allowing for frictionless use of cryptocurrencies. Furthermore, the systems described herein utilize a system structure supporting cryptocurrencies where cryptocurrencies can be backstopped. Backstopping of cryptocurrencies increases the usefulness of cryptocurrencies, but requires specific interactions between specific system components to function in a processing and memory efficient manner. The techniques described herein allow for processing and memory efficient backstopping of cryptocurrencies.

Additionally, the systems and techniques described herein include fixed cost compensation (e.g., of cryptocurrencies or other currencies) for determining potential relationship based fulfillment providers. The systems and techniques utilize various geofence determination techniques to provide for fixed cost compensation within at least one currency. Such techniques allow for the determination of potential relationship based fulfillment providers in a resource efficient manner.

Figure 1:
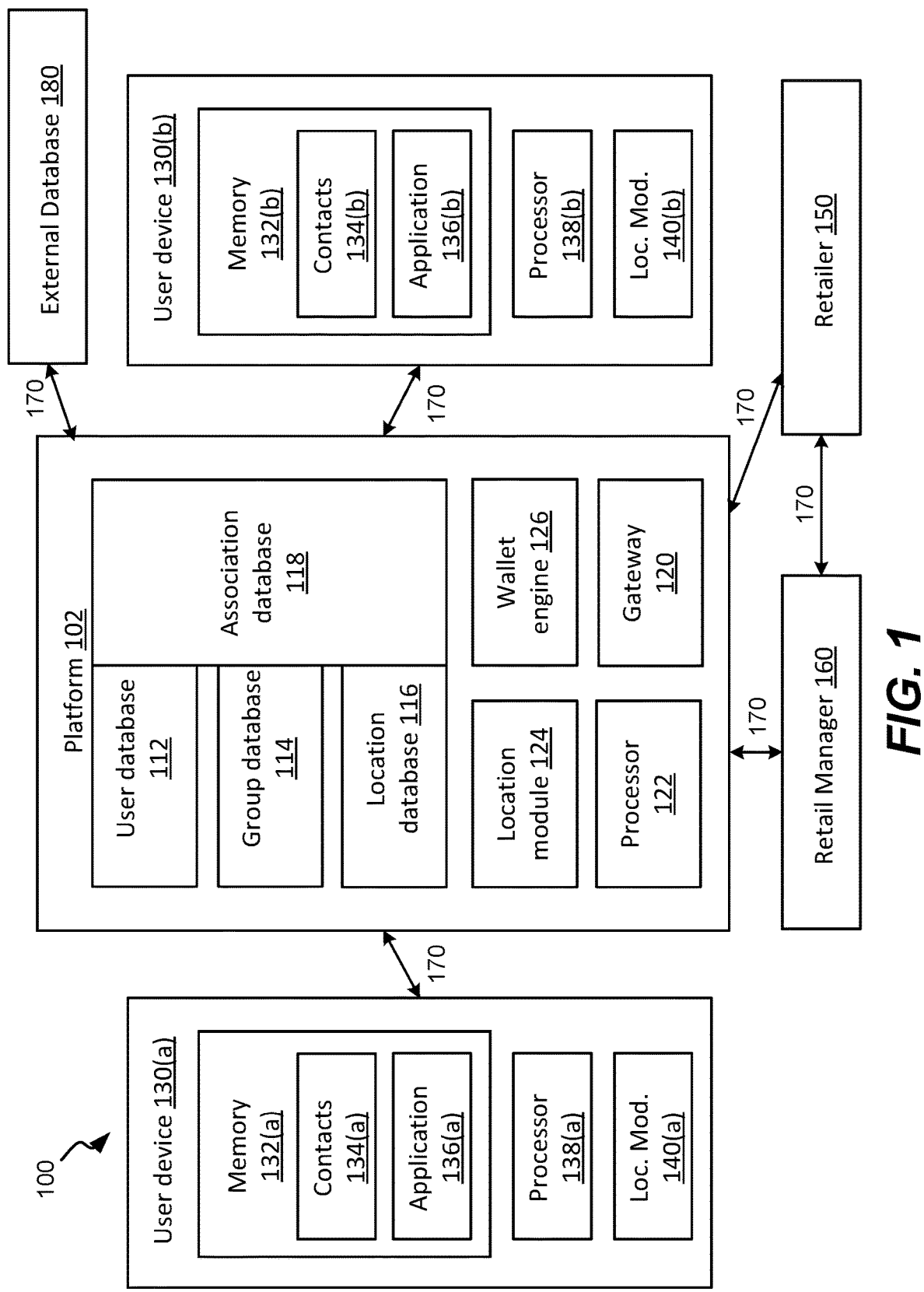
FIG. 1 illustrates a block diagram of an example system for relationship based fulfillment, in accordance with some embodiments.

FIG. 1 illustrates a block diagram of an example system for relationship based fulfillment, in accordance with some embodiments. FIG. 1 illustrates system 100 that includes a plurality of user devices, such as user devices 130(a) and 130(b), platform 102, external database 180, retailer 150, and retailer manager 160. Some or all of the various components described herein may be implemented with a combination of processors, memories, and APIs.

User devices 130(a) and/or 130(b) may be electronic devices of various users. Such users may be, for example, purchasers of items (e.g., requesting users) and/or potential delivering users for such items. In various embodiments, user devices 130(a) and/or 130(b) may be, for example, desktop computing devices, portable computing devices (e.g., laptops, tablets, smartphones, and/or other electronic devices), wearable devices, and/or other such electronic devices. Reference may be made herein to a user device "130" with associated components. It is appreciated that such reference may be to one or both of user devices 130(a) and 130(b), as well as other user devices. Each user device 130 may include memory 132, processor 138, and location module 140. Processor 138 may be configured to perform one or more operations of the techniques described herein. Processor 138 may be any type of single or multi-core processor that allows for electronic data processing.

Location module 140 may be configured to determine a location of user device 130. In various embodiments, location module 140 may be, for example, a global positioning system (GPS) device, an accelerometer, a gyroscope, a signal triangulation device, and/or another such device that allows for determination of a location of user device 130. In various embodiments, one or more techniques may be used individually or in combination to determine the location of user device 130. Location module 140 may be configured to generate location data indicating the location of user device 130. Such location data may be communicated to other devices (e.g., platform 102) via network 170.

Memory 132 may be any type of memory device configured to store data and/or instructions. Memory 132 may be, for example, a harddrive, a solid state device, and/or random access memory (RAM) and may include transitory or non-transitory computer-readable media. Memory 132 may be configured to store contacts 134 and/or application 136.

Application 136 may be stored within memory 132. Application 136 may be, for example, an application configured to allow a user to shop from various retailers (e.g., from brick and mortar retailers) and request "last-mile" delivery of items purchased, as described herein (e.g., through relationship based fulfillment). Additionally or alternatively, application 136 may allow users to provide such fulfillment for others. In various embodiments, application 136 may be configured to provide recommendations for potential delivering users and/or delivery opportunities based on the social contacts of the user. Thus, for example, application 136 may interface with contacts and/or other social based applications of user device 130 and determine social contacts of the user of user device 130. As such, for example, application 136 may log-in or share data with such social based applications and determine the contacts of the user accordingly.

Such social contacts may form the pool of potential partners that user device 130 provides to fulfilling certain tasks. Additionally or alternatively, application 136 may provide instructions to platform 102 to determine one or more social contacts appropriate for certain tasks and/or receive data directed to possible tasks for the user. In certain embodiments, application 136 may provide data to and/or receive data from platform 102. Thus, for example, application 136 may provide contacts 134 to platform 102 for use in performance of the techniques described herein.

Contacts 134 may be, for example, one or more social or group related contacts of the user. Thus, for example, contacts 134 may include contacts from a contact list stored within user device 130 (e.g., a phone number contact list or a contact list storing contacts in other ways). Contacts 134 may also include contacts not stored within a contact list of user device 130, such as contacts that the user has interacted with (e.g., called, messaged, or otherwise interacted with) that has not been stored in a contact list.

Contacts 134 may further include, for example, members of one or more groups (e.g., interest or social media groups) that the user is a member of. In various embodiments, membership within such groups may be determined by the user (e.g., the user may affirmatively join such groups) or may be determined automatically and/or suggested to the user (e.g., based on movement of the user and/or information consumed by the user, groups may be suggested to the user or the user may be automatically enrolled into such groups). In various embodiments, contacts 134 may be directly provided to platform 102 from user device 130, downloaded onto user device 130 temporarily before being provided to platform 102, and/or obtained from other services by platform 102 (e.g., through connections between platform 102 and various social media platforms). Thus, for example, application 136 may obtain permissions or credentials to access a user account on external database 180, which may be, for example, a social media or other such account of the user, and communicate such permissions or credentials to platform 102. Platform 102 may accordingly access external database 180 from such permissions or credentials.

Network 170 may be any wired or wireless communications connection that allows for data to be sent. Network 170 may be, for example, a wired Ethernet connection or a wireless connection such as WiFi, 3G, 4G, 5G, or another such connection that allows for data to be transmitted. In various embodiments, the various components of the systems described herein may utilize one, some, or all of such data connections to communication and/or receive data.

Platform 102 includes user database 112, group database 114, location database 116, association database 118, location module 124, wallet engine 126, processor 122, and gateway 120. The various components of platform 102 may be implemented on a server and/or on the cloud. In certain embodiments, the implementations may be physical, cloud resources utilizing various scalable or non-scalable system architectures, and/or other architectures including container architectures.

Processor 122 may be a single or multi-core processor, as described herein, configured to allow for platform 102 to perform the operations described herein. In various embodiments, platform 102 may be associated with a plurality of user accounts (e.g., the users of user devices 130(*a*) and 130(*b*)) and processor 122 may perform operations to carry out the techniques described herein for such account holders.

Location module 124 may be configured to receive location data from location module 140 of user device 130. Location module 124 may, thus, receive GPS, accelerometer, or other positional data indicating the location of user device 130. Location module 124 thus allows for determination of the location of various user devices (e.g., user devices 130(*a*) and 130(*b*)) that are associated with platform 102.

In various embodiments, location module 124 may be associated with one or more third party location services (e.g., various map services that provide locations of merchants and/or other parties). In such embodiments, location module 124 may be integrated with such third party location services and may, accordingly, provide and receive data (e.g., data indicating the locations of various merchants) from such third party location services.

Gateway 120 may be a gateway configured interface with various applications or programs of users, merchants, third parties (e.g., social media platforms), and/or other parties. Thus, for example, gateway 120 may be configured to interface with retailer 150, retailer manager 160, user devices 130(*a*) and/or 130(*b*) (e.g., via application 136(*a*) and/or 136(*b*)), and/or external database 180. Gateway 120 may, in certain embodiments, be an API gateway. As such, data communicated between platform 120 and retailer 150, retailer manager 160, user devices 130(*a*) and/or 130(*b*), and/or external database 180 may be provided through an API gateway. In certain embodiments where gateway 120 is an API gateway, gateway 120 may allow for integration with other APIs and/or programs. As such, the techniques described herein may be incorporated within various APIs and such APIs may be integrated with platform 102 as well as other platforms (e.g., third party platforms). In certain additional embodiments, gateway 120 may additionally include a security gateway that may be configured to authenticate various users and/or requests received by platform 102.

Retailer 150 may be, for example, a merchant or other item provider. Retailer 150 may include a merchant device such as an electronic device configured to communicate data with platform 102. Retailer 150 (e.g., the electronic device associated with the retailer) may, for example, be configured to receive orders from platform 102. Such orders may, for example, originate from user device 130(*a*) and/or 130(*b*).

Retail manager 160 may be an application or electronic device configured to coordinate various orders or shipments from various users. Retail manager 160 may, thus, allow retailer 150 to configure a store associated with retailer 150, create and/or list products, conduct marketing campaigns, manage orders and/or aid in performing fulfillment of the orders, and/or provide updates. In certain embodiments, retail manager 160 may be a seller management dashboard configured to scale and shorten the onboarding schedule for retailer 150 to register with or be associated with platform 102. Retail manager 160 may configure a portal for user device 130 to search for localized product inventory and obtain product data as well as be configured to provide a seller management tool (i.e., inventory updates and marketing efforts) for retailer 150.

Accordingly, for example, retail manager 160 may be configured to create a new product listing or update an existing product listing, create a marketing campaign that includes one or more of campaign type, bids, products, and/or other aspects of the marketing campaign. Retail manager 160 may additionally be configured to allow retailer 150 to determine their orders, organize their orders based on one or more states (e.g., organizing by "pending" orders may provide an output of orders based on their fulfilled states), search for specific orders (e.g., based on order ID, product data, customer, and/or another aspect), update order status, update product data, inventory status, order status, and/or marketing campaigns by bulk, and/or control other aspects associated with product listings.

In certain embodiments, retail manager 160 may coordinate retail of items of retailer 150 on platform 102. As such, platform 102 may allow users to purchase items for sale from retailer 150. Retail manager 160 in such an embodiment may coordinate storage on platform 102 of product data and the providing of the product data to user device 130. Retail manager 160 may further coordinate inventory management, order processing, fulfillment processing, and marketing.

Returning to platform 102, platform 102 may include one or more databases. Such databases may include, for example, user database 112, group database 114, location database 116, association database 118, and/or wallet module 126, which may include one or more databases such as a ledger database. Such databases may store data in the form of hard drive, solid state drives, and/or other memory storage devices. Each of user database 112, group database 114, location database 116, and/or association database 118 may be stored within separate physical devices or one or more such databases may share a storage medium. In various embodiments, the databases described herein may be organized in a manner that allows for faster retrieval of data from such databases. Furthermore, the databases may be structured to allow for more convenient cross referencing to other databases, for when determinations require a plurality of factors. Such databases may be, for example, NoSQL, Relation/SQL, and/or other types of databases.

User database 112 may be a database configured to store user account information and related social contact information. Accounts within user database 112 may include user as well as merchant accounts that are associated with platform 102. User database 112 may be structured to associate social contacts with a specific user. As such, user database 112 may include, for example, phone, social, and/or e-mail contacts of the user (e.g., from user device 130). Such contacts may be contacts that the user has a pre-existing relationship with. For example, such contacts may be contacts that the user has had previously documented contact with (e.g., through social media, phone calls, or message). In another example, even if no previously documented contact exists, users and contacts that are associated with one or more of the same location may be considered to be contacts. Such locations may be, for example, the same city, county, neighborhood, and/or another such location. Additionally or alternatively, relationships may be determined through other techniques that do not involve direct social contact, such as determining whether the user and contact are associated with the same school, church, workplace, hobby, and/or other such characteristics. In such embodiments, user database 112 may receive data from user device 130 and store the contacts of user device 130 within user database 112 while associated with the user. Storing the contacts of the user within user database 112 allows for quicker determination of potential delivering users from the social contacts of the user.

In certain embodiments, users within user database 112 may form the pool of both requesting users and delivery users. That is, unlike techniques that provide separate status for customers and service providers, each member within user database 112 may both request service and provide service. User data appropriate for both requesting and providing service may be accordingly stored within user database 112. When requesting service, such user data may allow for determination of potential delivery users that are appropriate for providing service to the requesting user. Additionally, such user data may allow for matching of a user as a potential service provider to another user requesting relationship based fulfillment. Such a configuration saves memory and allows for more flexible determination of potential service providers. Additionally, such a configuration allows for a larger pool of potential service providers according to the techniques described herein.

In various embodiments, the social contacts of a specific user stored within user database 112 may be categorized according to various different groups. Thus, for example, various contacts that the user has different levels of contact with (e.g., frequent, occasional, rare) may be categorized within different groups. Such categorization may be determined for groups associated with the user as well. The categorization may aid platform 102 in matching the user with appropriate potential delivering users.

Group database 114 may be a database configured to store groups associated with the user. Such groups may be, for example, interest groups of the user or groups that the user may be interested in (e.g., based on social history of the user, such as locations that the user frequents). In various embodiments, the data of group database 114 may be at least partially obtained from various social media platforms that the user is a member of. Such data may be obtained from user device 130 and/or external database 180. Thus, for example, group database 114 may obtain permissions or credentials to interface with one or more social media accounts of the user. Group database 114 may then, for example, obtain the groups that the user is a member of, typical hashtags used by the user and/or members of that group and/or that the user will respond to, categories or subjects that the user has shown an interest within, and/or other indications of interest from the user. Group database 114 may then store such groups, the interest or subject of such groups, members within such groups, the level of interest of the user of the group (e.g., based on the number of interactions that the user has per unit time with the group), and/or other aspects of the groups while associating such aspects with the user. In certain embodiments, such associations may be separately stored within association database 118.

Location database 116 may be a database configured to store data related to locations of the user and/or businesses (e.g., of retailer 150). Location database 116 may receive data indicating where the user is during the day and may then store data that may indicate the likelihood of the user at a specific area during a time of day. Furthermore location database 116 may include data directed to locations of retailer 150. Thus, location database 116 may include data directed to one or more physical locations (e.g., stores) of retailer 150. Location database 116 may include data directed to various establishments nearby the physical locations of retailer 150, such as their address, items or category of items offered for sale, their hours of operations, and/or other data.

Association database 118 may be a database separate from user database 112, group database 114, and/or location database 116 or may be integrated within such databases. Association database 118 may indicate the relationship between the various users, groups, and/or locations. As such, for example, data within association database 118 may receive the social contacts of a user stored within user database 112 and provide the related groups associated with each of those social contacts with data from group database 114. Additionally or alternatively, association database 118 may provide the locations of such social contacts or where the social contacts typically are at during a time of day. Thus, association database 118 may allow for various databases to access data stored within other databases, as needed, while maintaining separate databases. The maintenance of separate databases saves memory, allowing for more efficient storage of data, and allows for faster processing as data entry within the databases may be bereft of unnecessary information.

As contacts and other information stored may be sensitive information, the database structure of FIG. 1, with user, group, and location data separated, provides for more secure storage of user data. Furthermore, association database 118 may include data that cross references users, groups, and their locations. Data from separate association database 118 may thus be utilized to "piece together" the data of databases 112, 114, and 116. The data of association database 118 may refer to various data from databases 112, 114, and 116 and their relationships thereof, but such data may be encrypted or otherwise structured to not be useful on its own. As such, sensitive relationships and associations may be stored in a manner that provides for greater security.

Wallet engine 126 may be used to maintain and/or provide wallet services to users of platform 102. For example, wallet engine 126 may be configured to store one or more accounts associated with the various users of platform 102. Such wallet accounts may be associated with one or more users of user database 112. Thus, each wallet account may be associated with a specific wallet account. The wallet accounts may store and/or indicate a user balance on platform 102. The accounts stored on wallet engine 126 may be denominated in one or more currencies such as US dollars, one or more cryptocurrencies, currencies of other countries, and/or other such currencies.

In various embodiments, wallet engine 126 may be configured to provide payment for transactions on platform 102 and/or compensation for relationship based fulfillment. Wallet engine 126 may include a ledger that may be utilized to track compensation received and/or payment provided for various user accounts. Thus, the ledger may record when one or more accounts receives compensation for relationship based fulfillment (e.g., performed by the user) and increase their account value accordingly and may, additionally, record when one or more users provide for payment for items purchased from retailer 150 and may deduct the account accordingly. Such transactions may be conducted with various currencies, as described herein.

In certain embodiments, wallet engine 126 may be configured to interface with one or more external accounts or exchanges. Wallet engine 126 may be configured to transfer funds to such external accounts or exchanges (e.g., if an account holder wishes to transfer their funds outward or exchange one currency for another currency) by, for example, indicating on a blockchain that the external account has ownership of a number of coins and/or by transferring funds to the external accounts or exchanges. Wallet engine 126, when transferring to an exchange, may be configured to receive value in return for exchanges and may apply that value to the transferring account. External database 180 may be an example of such an exchange.

Figure 2A:
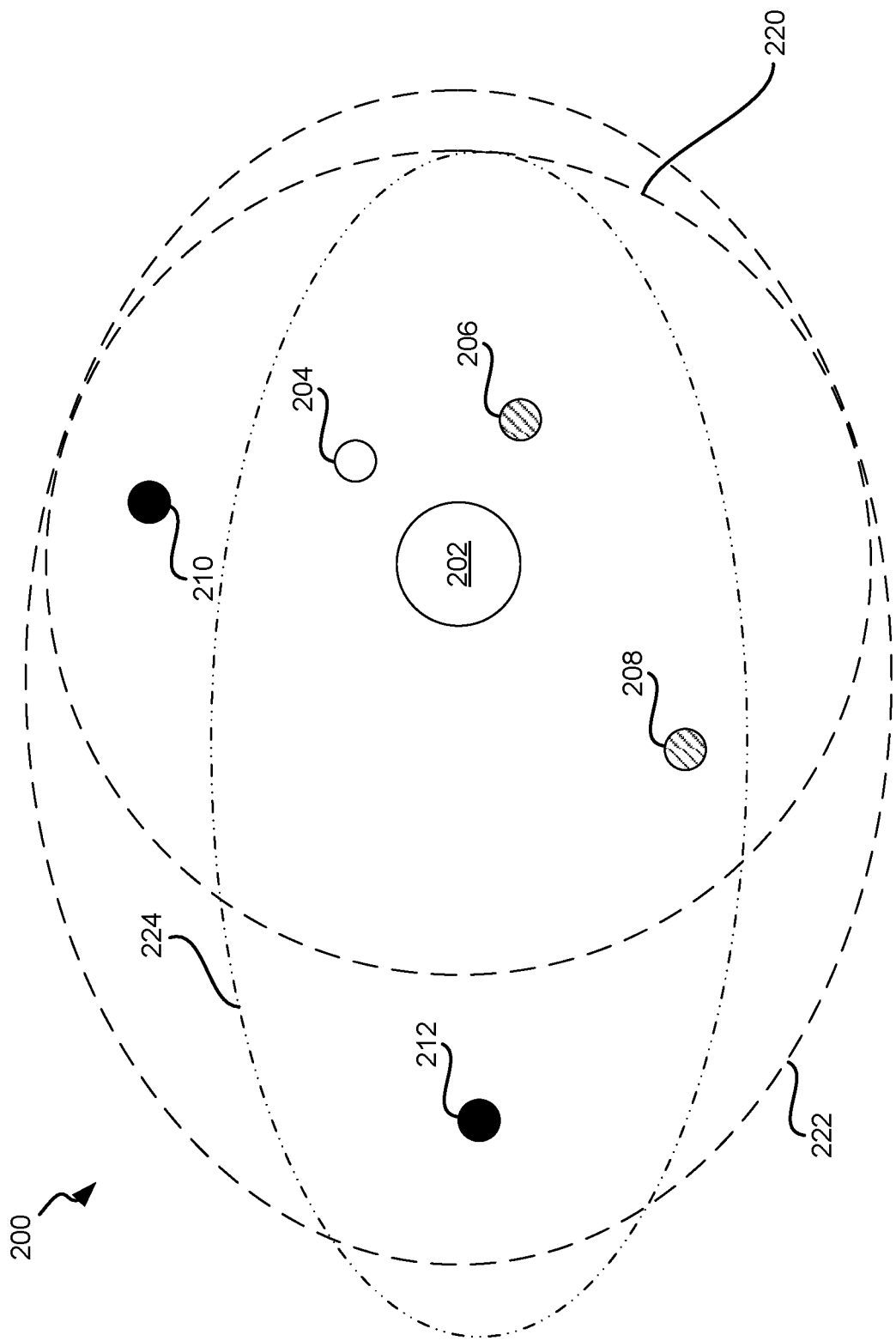
FIG. 2A illustrates an example of relationship based fulfillment, in accordance with some embodiments.

FIG. 2A illustrates an example of relationship based fulfillment, in accordance with some embodiments. While the current disclosure describes examples in the context of fulfillment, it is appreciated that other embodiments of relationship based tasks may be used in place of fulfillment. Thus, additional or alternative to fulfillment, the techniques described herein may be used for requesting the performance of tasks, running of errands (e.g., pick up of pets or children), and/or other such tasks.

FIG. 2A illustrates example 200 that includes retailer 202, potential delivering users 204-212, and geofences 220, 222, and 224. In example 200, a requesting user may have purchased an item from retailer 202 and requested relationship based fulfillment of the purchased item. That, is, the requesting user may have purchased or may be about to purchase an item from retailer 202 and may be looking for fulfillment from another. Such parties may include, for example, parties that the requesting user has had a relationship with or interacted with, parties within the same interest groups of the requesting user, and/or parties that the requesting user shares an interest with.

Potential delivering users may be determined based on their relationship to the requesting user, their distance to retailer 202, their distance from the requesting user's delivery address, and/or other such factors. In various embodiments, a platform such as platform 102 may presort potential delivering users based on one or more factors. Such factors may include, for example, the potential delivering user' daily schedule, ending location (e.g., place of residence), their current or planned activities, their mode of movement (e.g., driving, biking, walking, ride sharing, or another way they are moving), and/or their current or predicted future location.

Thus, for example, application 136 may include or interface with a user's schedule. That is, a user may provide a schedule to application 136 or application 136 may interface with a schedule stored on the user device. Determination of whether such a user would be appropriate as a delivering user may be based, at least, on schedule (e.g., whether the schedule of the user would take the user close to the place of residence of the requesting user, whether the user is free to provide such delivery, and/or other such factors).

In certain embodiments, the planned or scheduled activities of the user may be known from the schedule. Such planned or scheduled activities may include activity type and the location of the activities. Thus, the future locations of the user may be determined from such addresses. Furthermore, the activities may allow for a determination of appropriateness of requesting that the user provide for pick-up or fulfillment. For example, if the activity is "grocery shopping," that may indicate a high appropriateness for pick-up or relationship based fulfillment as the user may simply detour from the grocery store to another store within the same plaza. However, a user that is attending a business meeting may be less likely or appropriate to provide for relationship based fulfillment.

In other embodiments, daily trends of the user may be determined. Data from user device 130, such as location data (e.g., for determination of daily routes), schedule data, usage data of apps (e.g., payment apps, check-in apps, gaming apps), and/or other data may allow for determination of daily trends of a user. Machine learning and/or artificial intelligence may be utilized to determine the daily trends of the user. Accordingly, the likelihood of a user performing a certain activity and/or being within a certain area may be determined based on the daily trends.

Thus, for example, machine learning may be utilized to determine work, home, or other regularly visited locations of the user. Such determined locations may be refined and/or updated over time. Accordingly, for example, machine learning may be utilized to determine a location where the user typically ends their day (e.g., their home), and their typical daily travel routine (e.g., traveling to work and the work location for Monday to Friday and to church and the church location for Sunday). The machine learning may also be utilized to determine any changes to the routines and/or locations (e.g., if a user has moved home locations or switched work locations) based on periodically received location data from the user device. Machine learning may also allow for the determination of connections between unrelated aspects, such as aspects directed to schedules and routes. Thus, machine learning may allow for determination of relationships between certain outputs from inputs received, even if the inputs are not related or have a tenuous relationship to the outputs.

Additionally or alternatively to daily schedule and daily trends, the ending location of the potential delivering user (e.g., the place of residence or the location that the delivering user ends the day at) may be utilized as a factor. Typically, a user starts and ends their day at the same spot; the place of residence. Platform 102 may be configured to expect any user to be near their place of residence by the end of the day. As such, any delivery to an address near the place of residence of the user may be considered to be more convenient and, thus, more likely to be offered and/or accepted by the user.

The mode of movement of the potential delivering user may also be determined. In certain embodiments, such modes may include driving, biking, walking, ride sharing, and/or other movement modes. In various embodiments, data from one or more sensors and/or other applications of user device 130 may be utilized to determine the mode of movement of the user. Thus, for example, location module 140 or an accelerometer, gyroscope, or microphone (e.g., to determine the environment around the user) of user device 130 may be utilized to determine if movement of the user is indicative of driving, biking, walking, or another form of movement. Data from other applications of user device 130 may also be utilized to determine the mode of movement of the user. As such, for example, data from a ride sharing application may indicate that the user is ride sharing.

Based on the mode of movement, the likelihood or appropriateness of the potential delivering user providing relationship based fulfillment may be determined. Thus, for example, if the delivery address is more than a threshold distance away (e.g., only within driving distance), a user that is determined to be walking or biking may be considered less appropriate. Furthermore, a destination that is far away from the user's end destination may be determined to be less appropriate for a ride share traveling user as such a delivery may incur additional costs.

Based on such factors, the likelihood or appropriateness for delivery may be determined. In certain embodiments, the likelihood or appropriateness for providing relationship based fulfillment may be determined by providing a calculation where various factors are weighed (e.g., given numerical weights and an appropriateness rating determined). Such weighting may be according to the considerations described herein, with greater weighting provided to more important factors or factors that cannot be changed (e.g., the movement mode of the user) and less weighting given to other factors (e.g., the current activity of the user). A relationship rating between the requesting user and the potential delivering user may also be determined and used as a factor for the appropriateness rating. As such, for example, the frequency or number of times that the requesting user and the potential delivering user contact each other, the length of each contact, indication of the closeness of the user from such contact (e.g., from machine learning, spatial data, and/or graph databases), and/or other personal indications may be used. Factors that indicate a greater appropriateness or likelihood for delivery may increase the score, such as the user traveling by car, while factors that decrease the appropriateness or likelihood for delivery may decrease the score, such as the delivery address being far from the potential delivering user's ending location (e.g., place of residence).

Based on the likelihood or appropriateness for delivery, various possible potential delivery users may be determined and categorized. Thus, for example, users 210 and 212 may be considered to be very appropriate for providing potential relationship based fulfillment. Meanwhile, users 206 and 208 may be considered somewhat appropriate and user 204 may be considered not appropriate for providing potential relationship based fulfillment.

In certain embodiments, the locations of users, such as user 204-212, may be received by platform 102. In various embodiments, the locations of such users may be periodically received from the user devices of the users, constantly received, and/or received when allowed (e.g., when the user may be available for providing relationship based fulfillment). The user devices may provide location data to platform 102. In certain embodiments, platform 102 may receive such location data and determine one or more users appropriate for providing relationship based fulfillment of items. Platform 102 may offer a centralized service for such determinations, which may provide privacy protection to users and more efficient determination. Based on the location of the user devices, the likelihood or appropriateness for delivery may be further updated or a potential delivering user may be selected.

In various embodiments, one or more geofences may be present around the retailer of the item to be delivered or fulfilled. Thus, in example 200, geofence 220 and 222 may be established around retailer 202. Geofences 220 and 222 may be used to determine potential delivery users or select a potential delivery user.

Accordingly, initially, platform 102 may determine if there are any appropriate potential delivery users within geofence 220 around retailer 202. Platform 102 may identify user 210 as being very appropriate and within geofence 220. Platform 102 may then accordingly communicate a notification to the requesting user indicating that another user of the platform is available for relationship based fulfillment and/or provide a notification to user 210 asking whether they would be willing to accept a relationship based fulfillment opportunity. In various embodiments, the relationship between the requesting user and user 210 may be indicated within the request. Indicating such a relationship may, for example, establish trust between the users. The notification may be provided by, for example, a SMS message, an online message (e.g., through application 136 or one or more other messaging systems), and/or through another technique.

Based on the notification, user 210 may accept or reject the request for relationship based fulfillment. If user 210 accepts, relationship based fulfillment may be accordingly arranged as described herein. If user 210 rejects, ignores, and/or does not provide feedback, other candidate service providers may be appropriately identified or suggested. Thus, for example, platform 102 may determine that users 206 and 208, being somewhat appropriate users, may be potential relationship based fulfillment users. In such an example, platform 102 may, accordingly, first select or recommend user 206 as user 206 is closer to retailer 202.

Alternatively, platform 102 may expand the geofence and utilize geofence 222 to determine potential relationship based fulfillment users. As described herein, geofences may be of any appropriate shape. Thus, geofence 222 may be an oval shape compared to the circular shape of 220. The oval shape of geofence 222 may include a larger portion that is closer to the requesting user's residence or due to another geographic feature. Shaping the geofences in such a manner may allow for more efficient use of searching resources by, for example, only searching for potential relationship based fulfillment users within areas that will more likely return matches.

Based on geofence 222, platform 102 may determine that user 212 is very appropriate for providing relationship based fulfillment and is located within geofence 222. As such, larger geofence 222 allows for user 212 to be identified after user 210 has rejected the request for relationship based fulfillment. A further request may then be communicated to user 212.

In certain embodiments, a user may include their own geofence. For example, user 212 may include geofence 224. Geofence 224 may indicate the distance around user 212 suitable for user 212 to pick up an item for relationship based fulfillment. In certain embodiments, retailer 202 may be required to be within geofence 224 in order for user 212 to accept pick-up from retailer 202. Accordingly, in certain embodiments, retailer 202 may need to be within geofence 224 of user 212 and user 212 may need to be within geofence 222 in order for user 212 to be determined to be appropriate for providing relationship based fulfillment for pick-up of an item from retailer 202.

In certain embodiments, geofences 220, 222, and 224, as well as other geofences described herein, may be refined over time. Thus, for example, machine learning models may refine the shape and/or size of geofences 220, 222, and/or 224. Refinement of geofences 220, 222, and/or 224 may be based on, for example, improvements in determining the daily habits of users (e.g., improved understanding of when a user goes to the gym during a month), changes in daily behaviors of users (e.g., changing of schedules of users), determination of traffic patterns (e.g., changing of geofences associated with certain locations based on traffic patterns to optimize the convenience of pick-up and/or delivery), changes in locations associated with users (e.g., moving of residences or workplaces), changes in the determination of movements of users (e.g., changes in the estimated speed of movement of users based on the determined mode of movement, such as when a user may be determined to have become a more passive or slower driver), and/or other such considerations. Accordingly, the accuracy or efficiency of geofences may be improved through the techniques described. Improvement within such geofences may improve the operation of server devices by more accurately identifying appropriate users and, thus, transmitting requests and/or other data to only users that are appropriate for providing relationship based fulfillment.

Figure 2B:
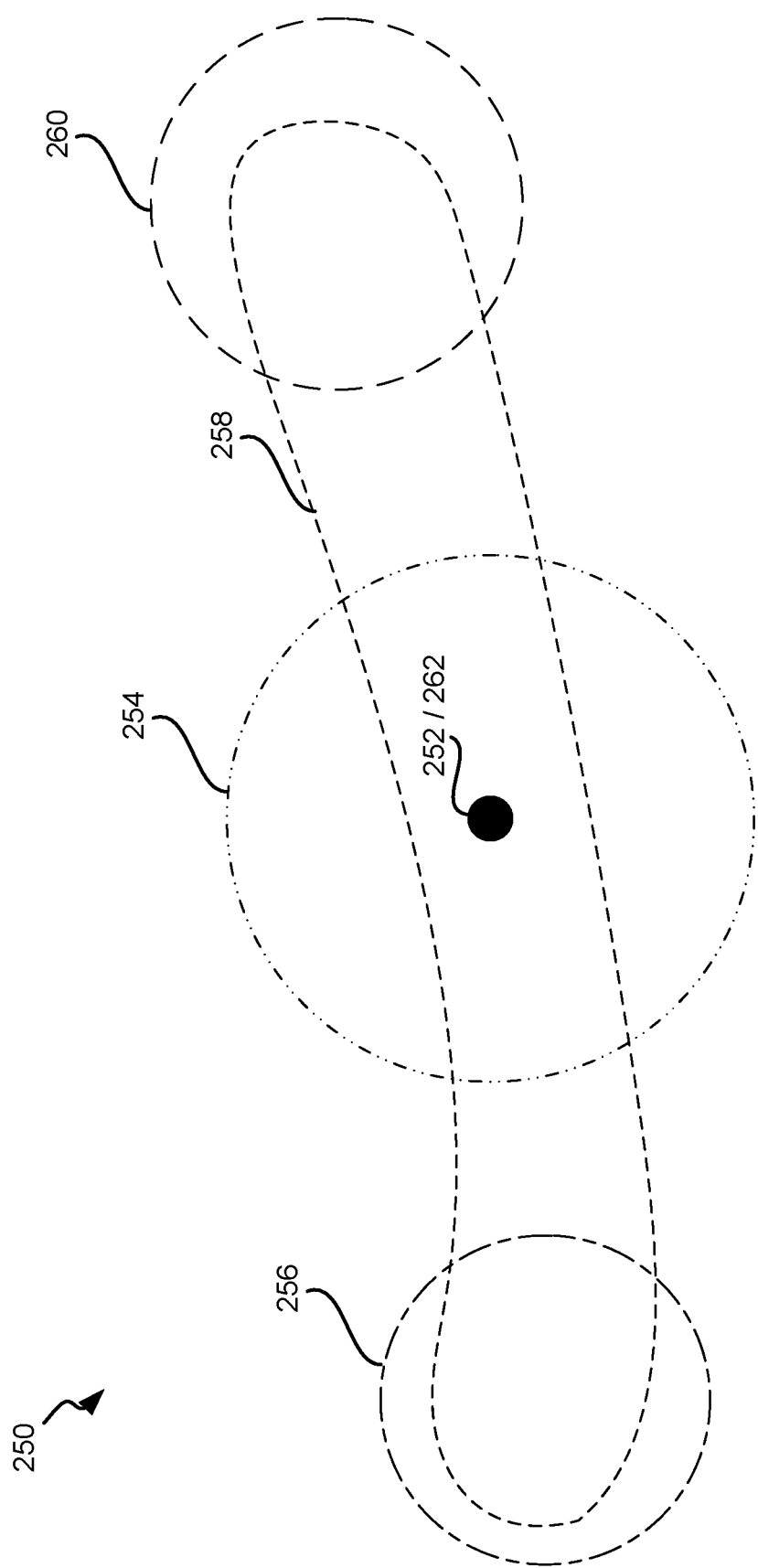
FIG. 2B illustrates another example of relationship based fulfillment, in accordance with some embodiments.

FIG. 2B illustrates another example of relationship based fulfillment, in accordance with some embodiments. FIG. 2B illustrates areas that user 252 may be associated with for providing relationship based fulfillment. In the embodiment of FIG. 2B, user 252 may be associated with one or more different areas and/or geofences at any one time, despite one, some, or all of those areas and/or geofences not being within close geographical vicinity of user 252.

Thus, for example, user 252 may be associated with geofences 254, 256, 258, and 260 while located at location 262. In certain embodiments, geofences 254 to 260 may be areas where user 252 may be determined as a possible relationship based fulfillment candidate. Geofences 254 to 260 may be variously associated with user 252 and may or may not be around the immediate location of user 252.

In various embodiments, one, some, or all of geofences 254 to 260 may be utilized as appropriate areas for user 252 to provide relationship based fulfillment pick-up or delivery. Accordingly, geofences 254 to 260 may be one, some, or all of the areas that user 252 may pick up items from for relationship based fulfillment and/or may provide delivery to for relationship based fulfillment.

For example, geofence 254 may be a geofence associated with the currently detected location of user 252. As such, geofence 254 may be located around the immediate location of user 252. Geofence 254 may be a geofence that is of a fixed or variable radius around location 262 and/or may be of another shape (e.g., rectangular, conforming to city streets, and/or another shape) and/or size around location 262.

Geofence 256 may be a geofence associated with a work location or other location associated with user 252. Thus, geofence 256 may be a geofence located around a work location of user 252. The work location of user 252 may be, for example, determined by information provided by user 252, from tracked movement data, from data provided by a third party, and/or from other data or techniques. The work location may be stored within user database 112. In other embodiments, geofence 256 may be associated with other regularly visited locations of user 252, such as a grocery store that user 252 visits once every few days, a church that user 252 visits every week, or a daycare center that user 252 visits everyday.

Geofence 258 may be a geofence associated with a regular route (e.g., commute) of user 252. Thus, geofence 258 may be of an area around the regular route. In certain embodiments, geofence 258 may be, for example, an area or a smaller radius or distance around the route compared to the distance of geofence 256 around the work location as a deviation from the route may be determined to be of greater inconvenience to user 252 than visiting a location around user 252's place of work (e.g., due to the duration of user 252's lunch break). In other embodiments, the size of the various geofences may be varied based on such or other considerations (e.g., convenience to users, free time of users, traffic conditions, and/or other such considerations).

Geofence 260 may be a geofence associated with a home location or other location associated with user 252. In certain embodiments, the various geofences may be different sizes or geometries depending on various known factors of user 252 (e.g., free time, convenience due to daily schedules, the possible types of transportation utilized by user 252, and/or other factors). Accordingly, geofence 260, being located around the home location of user 252, may be larger in size compared to geofence 256, as user 252 detouring to provide relationship based fulfillment on the way home may be more convenient than providing relationship based fulfillment when at work.

Geofences 254 to 260 may be varied by, for example, traffic conditions around user 252 or the detected mode of transportation of user 252. Accordingly, for example, the user device of user 252 may include one or more accelerometers, gyroscopes, GPS components, microphones, and/or other components. Data from such components allow for traffic conditions (e.g., based on traffic data received from other sources) and/or mode of transportation to be determined. For example, if the user device detects regular step like movement from its accelerometers, that may indicate that user 252 is walking. However, if location data from the user device indicates that the user is traveling at 60 miles per hour and is following roads, that may indicate that the user is driving. Based on the detected mode of transportation, the size and/or shape of geofences 254 to 260 may be varied. Thus, a walking user may result in smaller geofences while a driving user may result in larger geofences in order to accommodate the larger area of possible movement of a driving user. A user detected to be employing mass transportation may have the size and shape of the geofences accordingly adjusted to conform to known mass transportation stations and/or hubs. Thus, based on the detected mode of transportation, the areas that user 252 may provide pick-up from or delivery to for relationship based fulfillment may be accordingly adjusted.

Figure 3:
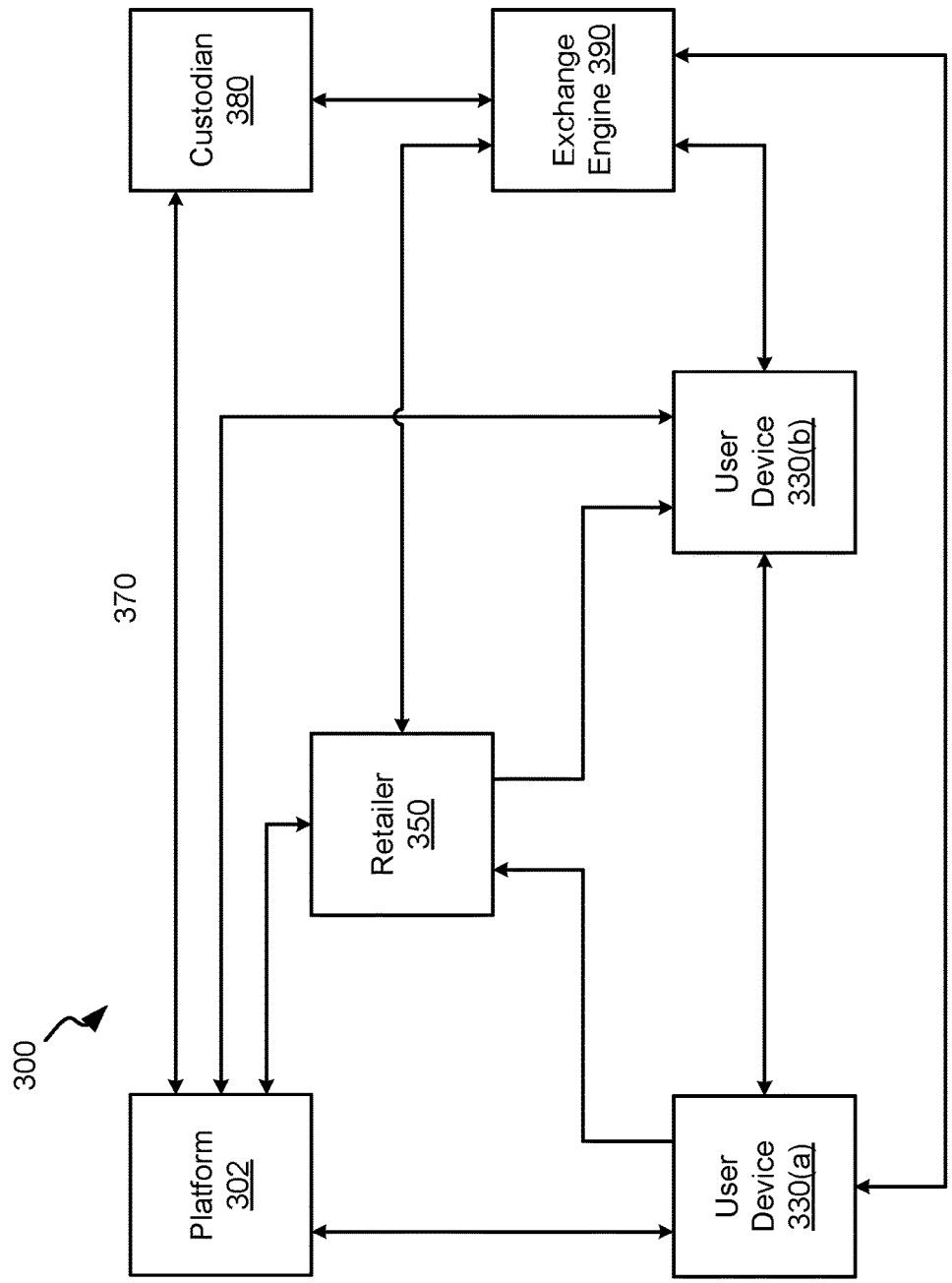
FIG. 3 illustrates a block diagram of an example system for coin based community based fulfillment, in accordance with some embodiments.

FIG. 3 illustrates a block diagram of an example system for coin based community based fulfillment, in accordance with some embodiments. FIG. 3 may illustrate system 300 that includes platform 302, user devices 330(*a*) and 330(*b*), retailer 350, custodian 380, and exchange engine 390. Communications channel 370 may allow for communications between the various components of system 300 and may include any communicate via any techniques described herein.

Conventional systems for cryptocurrency are unable to provide for the relationship based fulfillment techniques with coin compensation, as described herein. Meanwhile, system 300 of FIG. 3 illustrates a unique system and database structure for performing the relationship based fulfillment techniques, with coin compensation. Thus, for example, system 300 allows for the determination of coin recordation events to conserve system resources and improve transaction speeds that utilize coins or other such cryptocurrency. Furthermore, system 300 allows for the backstopping of the coins via the backstop entity.

Platform 302 may be similar to platform 102, user devices 330(*a*) and 330(*b*) may be similar to user devices 130(*a*) and 130(*b*), respectively, and retailer 350 may be similar to retailer 150. Platform 302 may allow users to purchase items from retailer 350 and obtain relationship based fulfillment for purchased items from other users associated with platform 302. Compensation may be provided for performing relationship based fulfillment and/or for providing purchased items. In various embodiments, such compensation may be of various types of currencies such as US dollars, one or more cryptocurrencies, currencies of other countries, and/or other such currencies.

Custodian 380 may be a backstop entity. In certain embodiments, platform 302 may provide cryptocurrency for compensation for transactions and/or relationship based fulfillment performed. In such embodiments, such cryptocurrency may be a blockchain based currency (e.g., a "coin") that may be associated with platform 302. The coin may be utilized to provide compensation for relationship based fulfillment and/or for purchasing items from retailer 350. In certain embodiments, platform 302 may be configured so that the coin may be exchanged for other currencies (e.g., US dollar) and/or transferred to external wallets. One or a plurality of coins, as well as fractional amounts of coins, may be utilized for compensation, transaction, exchanges, and/or transfer.

In various embodiments, custodian 380 may be configured to provide a backstop for exchange between the coin and other currencies. Thus, for example, custodian 380 may be configured to provide for a minimum exchange rate between the coin and other currencies. Thus, in certain situations, such as when a user requests an exchange of the coin to another currency, platform 302 may first be configured to determine an exchange rate for the coin (e.g., via communications with exchange engine 390). If the exchange rate of the coin is below a threshold exchange rate (e.g., 1 coin for 1 US dollar), platform 302 may then according communicate with custodian 380 and communicate a backstop request to the backstop entity of custodian 380. The backstop request may request that the backstop entity provide for exchange between the coins (e.g., for the coins of the user requesting exchange) at an agreed upon rate (e.g., at the threshold rate) and the backstop entity may then provide for exchange at the agreed upon rate.

In certain embodiments, the blockchain based coins may include one or more records indicating the ownership chain of the coin. In techniques described herein, platform 302 may write such records onto the blockchain of the coins. Platform 302 may include a ledger for all allocations and/or transactions of the coin/cryptocurrency on platform 302 (e.g., to users, between users, and/or between the users and merchants). In certain embodiments, the ledger may include interface with the blockchain and provide handshake transactions. The ledger may, in certain embodiments, receive data from the records of the blockchain and may, in certain embodiments, additionally include all transfers of the coin, even external to the platform. As such, the ledger may be linked to the blockchain and may be utilized as a memory and resourcing saving addition or alternative to blockchain recordation for certain transfers, such as internal transfers of the coin within the platform. Thus, platform 302 may not record events and/or transfers of ownerships of coins (e.g., one or more and/or a fractional amount) onto the blockchain until the coin has been transferred externally from platform 302 (e.g., written to belong to an external wallet, to the backstop entity, and/or otherwise to another external entity or account). Thus, platform 302 may utilize complementary or supplementary techniques in addition to blockchain recordation for coin allocations and/or transfers within platform 302 (e.g., between accounts stored within platform 302), such as recordation of internal transfers within accounts of platform 302 onto a ledger.

As blockchain recordation may utilize a significant amount of memory and resources and may be a significant impediment to transactions utilizing cryptocurrencies, the techniques described herein allow for the utilization various cryptocurrencies within transactions in a resource efficient manner. Thus, such techniques may improve the operation of computing systems for allocations and transfers of cryptocurrency by increasing the speed and decreasing the processing and memory usage of such transactions with cryptocurrencies. As such, transactions utilizing blockchains may be improved from a speed and convenience standpoint, as well as a processing and memory usage standpoint, utilizing the techniques described herein.

In various embodiments described herein, a user associated with user device 330(*a*) may be utilized to search platform 302 for products for sale from retailer 350 and purchase such products. Once a transaction has been conducted, platform 302 may then communicate with other users (e.g., of user device 330(*b*)) to provide relationship based fulfillment. The transaction may be conducted with any currency described herein.

The user of user device 330(*b*) may then provide relationship based fulfillment of the items purchased within the transaction. The user of user device 330(*b*) may be compensated for preforming relationship based fulfillment. Compensation may be with any currency described herein. The compensation may be recorded within the ledger and the appropriate compensation amount may be associated with the user of user device 330(*b*) (e.g., within the user account of the user within the ledger). In certain embodiments, though the compensation may be with the cryptocurrency, as the compensation is within platform 302, recordation within the blockchain may not be performed and may only be recorded within the ledger.

In certain situations, retailer 350, a user, and/or another account holder may exchange the coin for another currency. Exchange engine 390 may be, for example, a marketplace where buyers and sellers may engage in transaction for the exchange of the coin into other currencies. Exchange engine 390 may be configured to indicate a current exchange rate for the exchange of the coin into various currencies. Thus, platform 302 may determine an exchange rate for the coin (e.g., via communications with exchange engine 390) and if the exchange rate is below a threshold exchange rate, platform 302 may then according communicate with custodian 380 and request a backstop transaction. Custodian 380 may then confirm the backstop transaction for the agreed upon amount (e.g., at the threshold exchange rate). Exchange engine 390 may then provide the coins for exchange by recording the transaction with custodian 380 (e.g., purchasing the coins at the agreed upon exchange rate) on the blockchain and receiving other (e.g., non-coin) currency from custodian 380 and providing the other currency to the requesting account. Otherwise, if the exchange rate is at or above the threshold amount, platform 302 may allow for the exchange to proceed on the open market and, thus, record the details of the exchange on the open market within a record of the blockchain.

Figure 4:
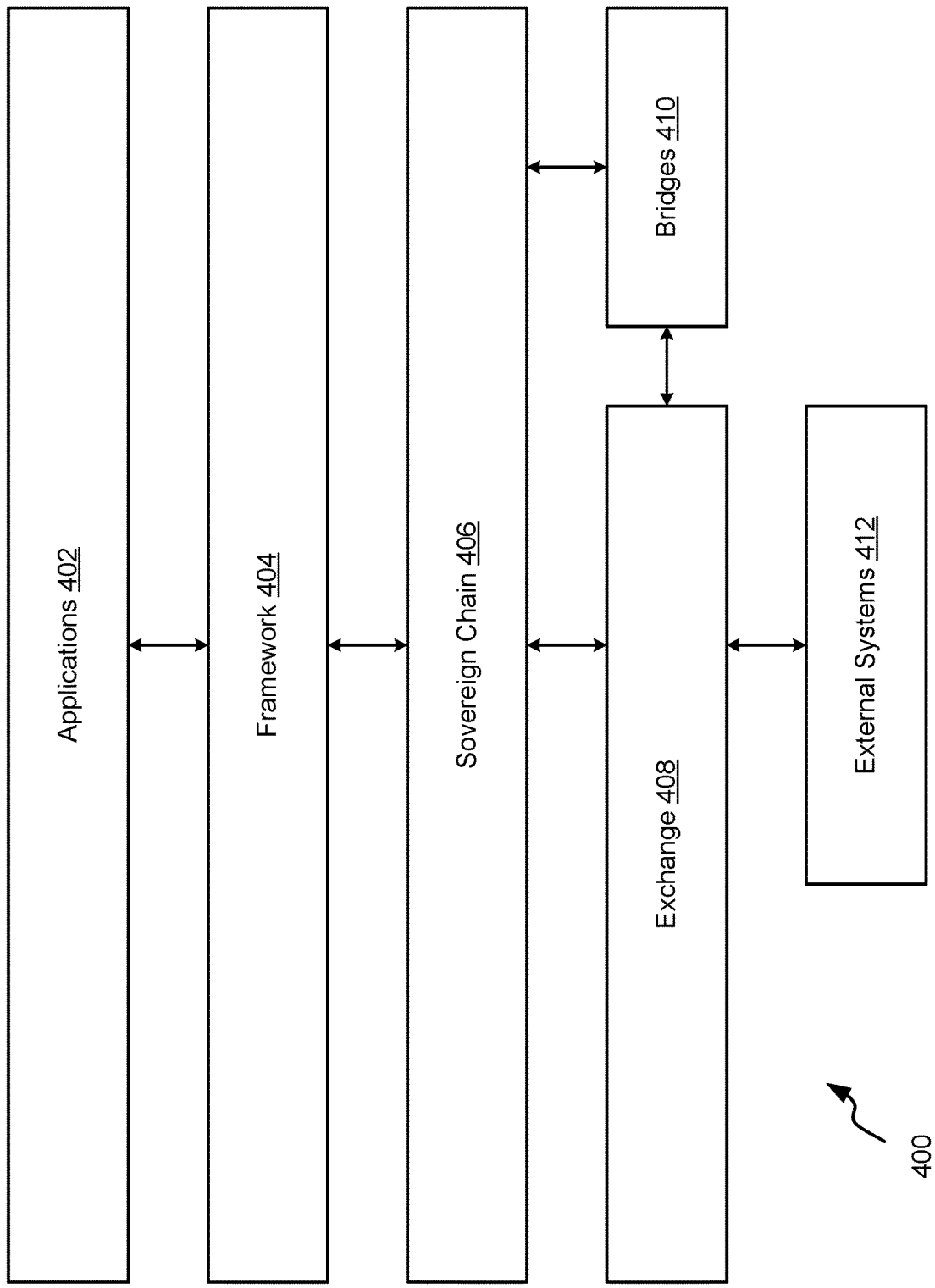
FIG. 4 illustrates a block diagram of another example system for coin based community based fulfillment, in accordance with some embodiments.

FIG. 4 illustrates a block diagram of another example system for coin based community based fulfillment, in accordance with some embodiments. FIG. 4 illustrates system 400 that includes applications 402, framework 404, sovereign chain 406, exchange 408, bridges 410, and external systems 412.

Applications 402 may be an application on an electronic device, as described herein. Applications 402 may include any application associated with any one of the service provider associated with the platform, retailers/merchants, users of the platform, the custodian, and/or other entities associated with systems and techniques described herein. Thus, for example, applications 402 may include, for example, a ledger system, a relationship based fulfillment manager, a merchant/item searching and ordering system, a payment system, a wallet system, and/or an application associated with communications with a custodian. Applications 402 may include one or more APIs as described herein.

Such APIs may, for example, allow for a user to purchase one or more items from a retailer, using any currency described herein. The API may also allow for the user to arrange for relationship based fulfillment and for the user providing the relationship based fulfillment to be compensated, as described herein. The API may, accordingly, allow for users to access one or more processes of the platform and/or framework 404 as well as access one or more databases of the platform and/or framework 404.

Applications 402 may communicate with framework 404. Framework 404 may receive communications from applications 402 of various electronic devices and provide for an output based on the data received. Thus, framework 404 may include an API gateway as well as databases/memory and a processor configured to perform the actions described herein. In various embodiments, framework 404 may include applications that allow for the allocation of and/or transactions utilizing cryptocurrency or coins as described herein. Thus, for example, framework 404 may include a database that includes the wallets of various users and/or accounts (e.g., merchant accounts) of the platform. Framework 404 may, thus, allocate coins, conduct transactions that involve the coins (e.g., for payment), exchange coins for another currency, and/or conduct other transfers that involve such coins. Framework 404 may further include a ledger that may record transactions. The ledger may record one, some, or all transactions on the platform. In certain embodiments, framework 404 may include one or more security components. Such security components may be configured to authenticate various users, transactions, and/or transfer/exchange requests received by framework 404.

In various embodiments, framework 404 may determine, for an allocation, transaction, or exchange, if a blockchain record event has occurred. Such a determination may be according to the techniques described herein. If a blockchain record event has occurred, a handshake may occur between the ledger and the blockchain. Based on the handshake, the allocation, transaction, and/or exchange may be recorded onto a blockchain, such as sovereign chain 406, according to various techniques.

Sovereign chain 406 may be a blockchain associated with a coin. Sovereign chain 406 may be a chain based on, for example, a substrate system. Sovereign chain 406 may indicate the various allocations and transfers of the coin. In certain embodiments, sovereign chain 406 may only indicate transfers meeting certain conditions. Thus, for example, sovereign chain 406 may only indicate ownership and/or transfers where an amount of the coin is associated with an external account (e.g., external wallet account) outside of the databases of the platform (e.g., of framework 404). Sovereign chain 406 may indicate transactions and/or transfers of the amount of the coin outside of the ecosystem of the platform.

Thus, sovereign chain 406 may interface with exchange 408 for exchanging coins into other currency. Exchange 408 may be an open market where users may exchange and/or receive coins for other currencies. In certain embodiments, exchange 408 may be backstopped by a custodian (e.g., backstop entity). Backstop entity may provide for exchange at a previously agreed upon rate if the exchange rate of the coin is lower than a threshold amount.

Sovereign chain 406 may additionally interface with bridges 410. Bridges 410 may allow integration of other blockchains with sovereign chain 406 or vice versa. Thus, for example, other parachains may integrate with sovereign chain 406 (e.g., via nodes within sovereign chain 406) to allow other parachains to integrate aspects of the ecosystem of sovereign chain 406.

External systems 412 may be other external systems such as that of merchants, custodians, and/or other such entities. External systems 412 allow for decentralized operations within system 400 and, thus, not all entities and/or operations need to be on the platform to take advantage of aspects of the platform. Nonetheless, all transactions or exchanges utilizing the coin, including transactions external to the platform, may be recorded within the blockchain of the coin.

Figure 5:
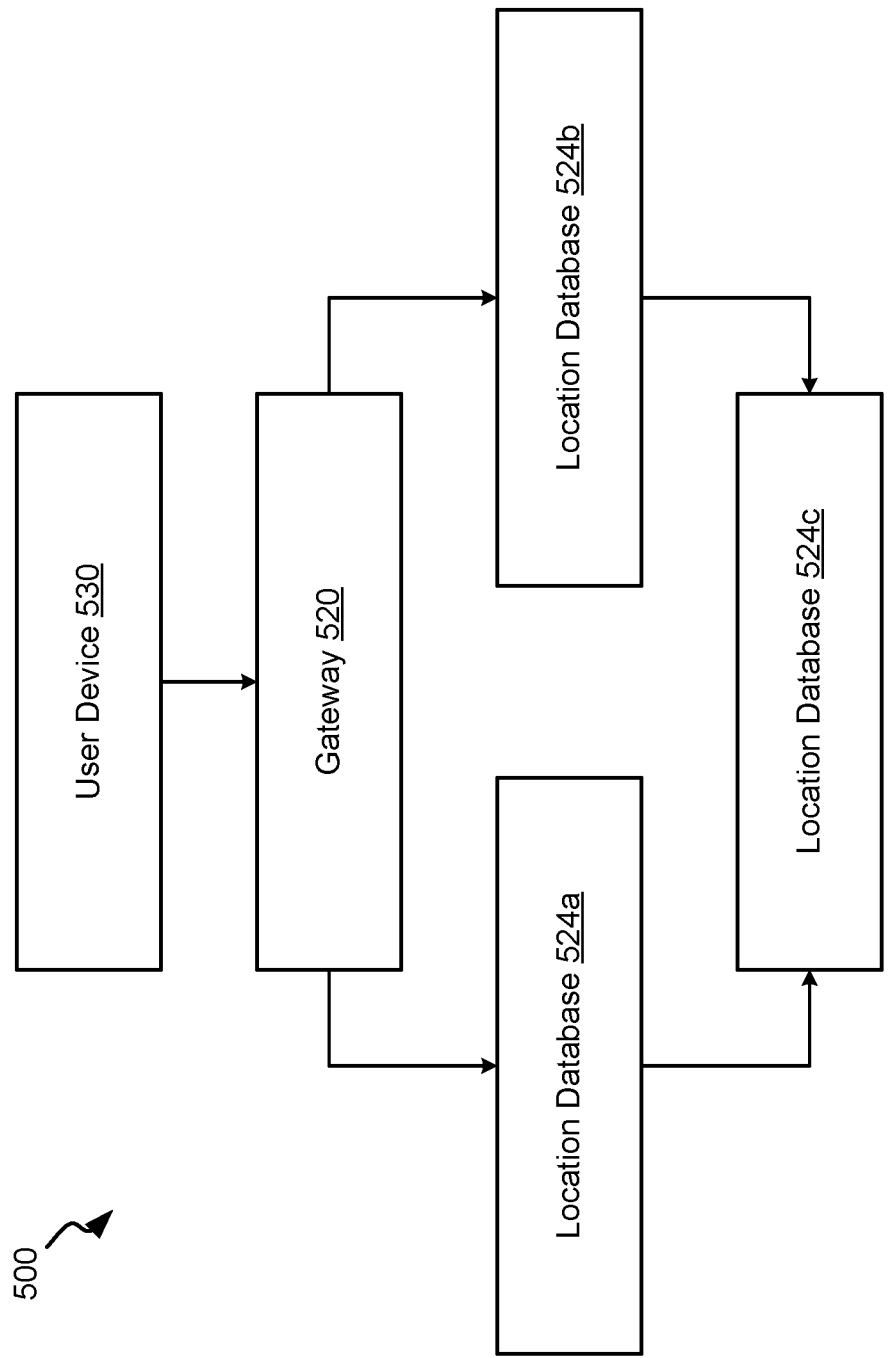
FIG. 5 illustrates a system diagram of a location determination system for community based fulfillment system, in accordance with some embodiments.

FIG. 5 illustrates a system diagram of a location determination system for community based fulfillment system, in accordance with some embodiments. System 500 of FIG. 5 includes user device 530, gateway 520, and location databases 524(a), 524(b), and 524(c).

User device 530 may be similar to that of user devices described herein. User device 530 may include one or more applications and may interface with gateway 520. Gateway 520 may be, for example, similar to gateway 120. Gateway 520 may be an API gateway configured to receive data from user device 530 as well as other electronic devices. Gateway 520 may, for example, receive location data from user device 530 and/or a request to provide relationship based fulfillment.

Gateway 520 may utilize data received from user device 530 to provide relationship based fulfillment and/or determine locations of various requests and/or users (e.g., potential providers of relationship based fulfillment). As such, for example, location database 524(a) may be a database indicating locations of various orders and/or requests for relationship based fulfillment (e.g., the pick-up and/or drop-off locations). Data for location database 524(a) may be from received relationship based fulfillment requests. Location database 524(b) may a database indicating current locations of users and/or various determined locations of such users (e.g., daily ending locations and/or work locations). Data for location database 524(b) may be from current and/or historical location data received from user devices.

Location database 524(c) may receive data from location database 524(a) and 524(b) and provide a database with the combined locations of various aspects of database 524(a) and 524(b). Thus, location database 524(c) may allow for tracking of the various requests and locations of potential providers. Location database 524(c) may, accordingly, be utilized to determine appropriate relationship based fulfillment candidates for various relationship based fulfillment requests.

Figure 6:
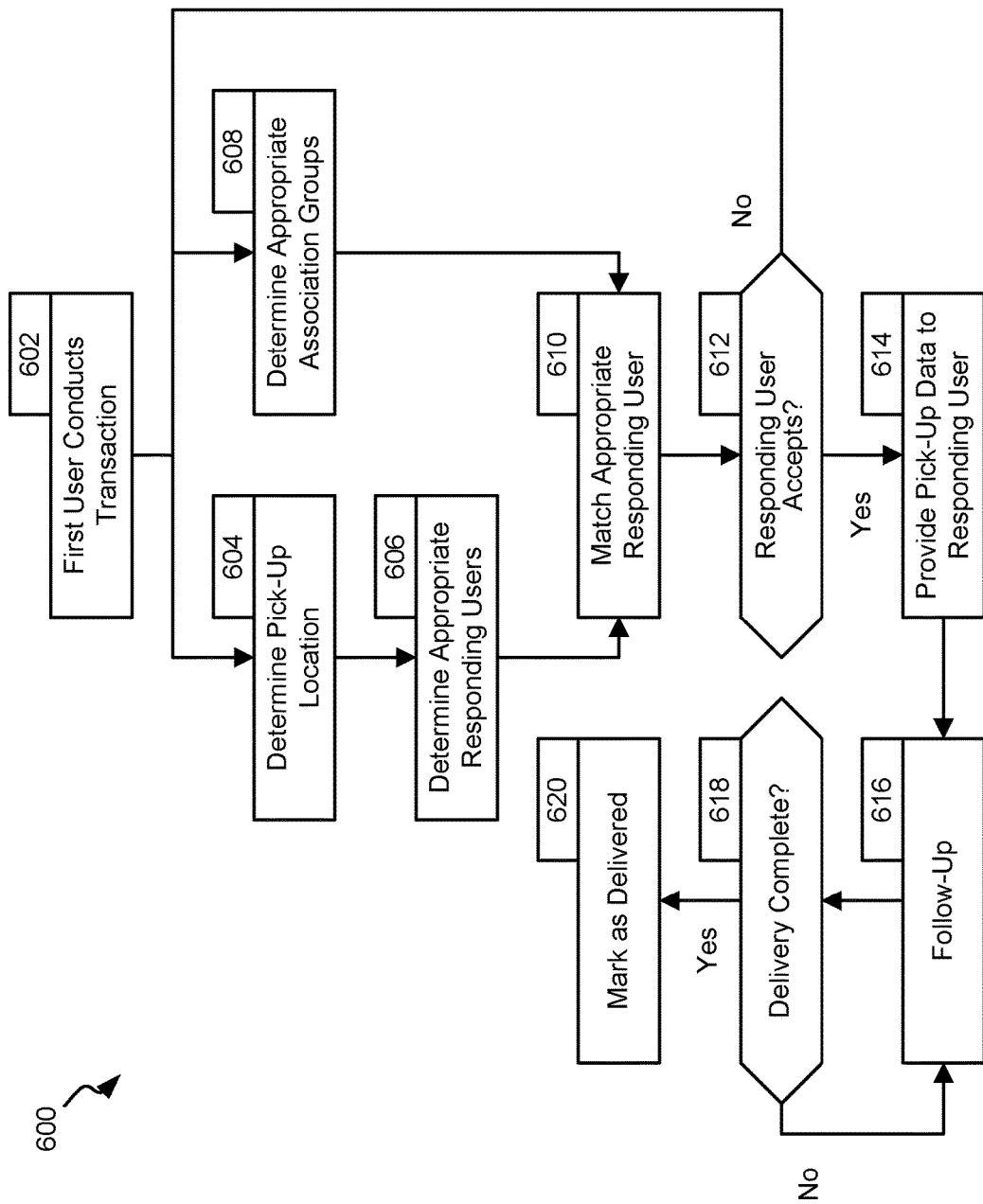
FIG. 6 is a process flowchart corresponding to a relationship based fulfillment technique, in accordance with some embodiments.

FIG. 6 is a process flowchart corresponding to a relationship based fulfillment technique, in accordance with some embodiments. Technique 600 of FIG. 6 is directed to a technique for providing and coordinating relationship based fulfillment.

In 602, a first user conducts a transaction. The transaction may include purchasing of one or more items from one or more brick and mortar shops from the platform. The transaction may include a request for relationship based fulfillment of the order. In certain embodiments, the order and request for relationship based fulfillment may be included within the same request, but in other embodiments the order and the request may be different requests and may, in fact, be provided to different entities.

The order and/or the request for relationship based fulfillment may include a pick-up location (e.g., the location of the store providing the item). The pick-up location may be determined in 604 by, for example, determining the location of the store from the order, by having the user specify a pick-up location, and/or through consulting of one or more databases described herein to determine the location of the store. In certain embodiments, the transaction may include orders from a plurality of locations of a retailer and/or from a plurality of different retailers. In such embodiments, the pick-up location may be determined for each of the orders from the plurality of locations and/or retailers.

Based on the pick-up location, potential relationship based fulfillment users may be determined in 606. Such potential relationship based fulfillment users may be users that are within a threshold distance or within a geofence proximate to the pick-up location. Furthermore, relationships of the potential relationship based fulfillment users to the requesting user may be determined. Additionally, other categories, such as willingness to accept certain currencies (e.g., the coin) may also be determined for the potential relationship based fulfillment users. Such aspects may allow for determining a willingness or suitability for providing relationship based fulfillment for each of the various potential relationship based fulfillment users may be categorized according to. In embodiments where the order includes a plurality of locations and/or retailers, one or more potential relationship based fulfillment users may be determined. Accordingly, while pick up from certain nearby locations may be accomplished with the same relationship based fulfillment user (as the destination address is all the same), other situations may utilize a plurality of different relationship based fulfillment users. Pick-up for each location may be determined according to the techniques described herein. Such determinations may be separate for each location or, when locations are within a threshold distance (e.g., within the same shopping plaza), may be a shared determination for a plurality of such locations.

Furthermore, in 608, appropriate association groups associated with the requesting user may be determined. Such association groups may be determined from, for example, social groups that the resulting user is a part of, various social contacts and the interests and/or social groups that the social contacts are a part of, listed and/or stored interests of the requesting user. In certain embodiments, based on the contacts and/or interests of the requesting user, the appropriate association groups (e.g., groups that the requesting user has interests in) may be determined. The user may additionally specify one or more groups and/or interests (e.g., within application 136). Appropriate association groups may also be determined for the user (e.g., based on machine learning from location data of the user) based on data determined from actions of the user (e.g., from data of user device 130). As data may be periodically or continuously received from user devices (e.g., location data as well as data from applications of the user device), machine learning may be utilized to refine and/or update association groups that are determined for the user.

For example, a user may indicate that the user is a member of a church. The church may then be added as an association group related to the user (e.g., within group database 114). Furthermore, location data provided by the user device may indicate that the user is at a specific location every evening on Monday, Wednesday, and Friday. Based on data from location database 116, that location may be determined to be a community college. As such, the community college may then be added as an associated group related to the user. Additionally or alternatively, the user may be determined to be an amusement park annual pass holder (e.g., from location data or data of an application associated with the amusement park provided by the user device). As such, the amusement park may be added as an associated group related to the user. In certain embodiments, user data and/or association data of the user (e.g., stored within user database 112 and/or association database 118) may indicate that the user is at the location of the church and community college, or otherwise performing tasks associated with the church or community college, at certain specific and regular times of the week. Such times may be utilized in the determination in 610. In certain such embodiments, the user may be given the option to opt out of one, some, or all of the techniques described herein (e.g., via a user interface). If the user opts out of certain such techniques, the user device may not receive and/or provide data associated with the techniques. The user may, additionally, opt back in at a future time.

Based on the association groups, various users may be associated with various locations even if they are not currently nearby such locations. Thus, for example, a user may be a part of or may be indicated to be linked with an association group related to a church or community college. Associations groups expand the pool of potential relationship based fulfillment users. Furthermore, the association groups may allow for social connections between various users with a geographic connection and, thus, allows for establishment of meaningful social relationships. Such social relationship may then increase the social relationship between the users (and such increases may be reflected within data stored in association database 118) and may, thus, increase the suitability score for relationship based fulfillment between the various users. Other embodiments may determine decreased social relationships between users (e.g., based on decreased amounts of associations) and accordingly decrease the suitability score.

As such, in certain embodiments, when a requesting user requests relationship based fulfillment from the pick-up location, users in groups that are associated or nearby the pick-up location may also be searched, in addition to users that are currently nearby the location. As such, if the pick-up location includes a nearby community college, association groups related to the community college may also be searched for potential relationship based fulfillment users. Such a technique allows for determination of a larger potential pool of relationship based fulfillment users than that of simply users who are nearby. In such an example, even though a user may not be currently nearby the requested pick-up location, membership or being associated with the association group may indicate that the user may, in the future, be nearby the requested pick-up location. In certain embodiments, association with the group may be combined with, for example, a predicted schedule of the user. As such, the class schedule of a user of the community college may be predicted and, thus, a determination made that the user has class on Monday, Wednesday, and Friday. As such, such a user may be determined to be available for relationship based fulfillment from the pick-up location if the request is on a Monday, Wednesday, or Friday.

Based on determinations of 604-608, one or more potential relationship based fulfillment users may be determined in 610, according to techniques described herein. In certain embodiments, an appropriate relationship based fulfillment user may be selected from the one or more potential relationship based fulfillment users, according to the techniques described herein. A request to provide relationship based fulfillment may then be provided to the selected potential relationship based fulfillment user. Such a request may be in the form of a SMS message, an online message, an online request, and/or another such request (e.g., provided by an application). The request may allow the potential relationship based fulfillment user to accept or decline (e.g., through one or more buttons) and may, in certain embodiments, include information related to potential compensation for performing the relationship based fulfillment.

Data associated with the locations of potential relationship based fulfillment users may be utilized for 610. In certain embodiments, the user devices may constantly or regularly (e.g., periodically within seconds, minutes, hours or another timeframe) provide location data to the platform and such data may then be utilized in 610. In other embodiments, the platform may request location data from the user devices of the appropriate potential relationship based fulfillment users (e.g., from an analysis identifying appropriate potential contacts of the user) upon determining an initial match of appropriate users. Other embodiments may, alternative or additional to receiving location data, or when location data is not received, determine estimated locations based on the techniques described herein (e.g., via locations estimated by machine learning). Such determinations may then provide such data for determining the potential relationship based fulfillment users.

In various embodiments, matching may be performed by the user device and/or the platform. In certain such embodiments, data from the retailer and/or the user device may be provided to the platform (e.g., the location data of users associated with the platform as well as order data from the user device of the requesting user and/or from the retailer). The platform may then perform the appropriate matching. Once one or more potential relationship based fulfillment users for performing the requested fulfillment is identified, a most appropriate relationship based fulfillment user (e.g., the relationship based fulfillment user that has the highest calculated suitability score) or group of users may be identified. The platform may then communicate a message to the various user devices of those users to request a response as to whether that user is able to perform the fulfillment. Such a request may expire within a set timeframe.

Utilizing the platform to perform such calculations and communications allows for more accurate calculation and centralization of data. For the platform to perform such techniques, the contacts of the users (e.g., phone contacts and/or social media contacts) may be provided to the platform. The platform may then securely store the contacts within the databases, such as the databases described in FIG. 1. Platform 102 providing for such determinations allows for more memory efficient and faster performance of the techniques described herein.

The potential relationship based fulfillment user may accordingly accept, not respond, or reject the request in 612 (e.g., by toggling an accept or reject button within the request). If the potential relationship based fulfillment user does not accept the request, the technique may return to 604 and 608 and a new matching potential user selected. If the potential relationship based fulfillment user accepts, the technique may proceed to 614.

In 614, after the potential relationship based fulfillment user has accepted the request, pick-up data may be provided to the relationship based fulfillment user that has accepted or selected. The pick-up data may include data related to the pick-up address (e.g., address of the brick and mortar shop), how to pick up the item, the identity and/or quantity of the item. Pick-up data may be provided by the retailer and may include data related to the time at which an order is ready to be picked up. After an order has been picked up, an update is provided to the platform and, in certain examples, to the requesting user. Status of the order may then be updated accordingly.

In certain embodiments, follow-up of the delivery may be performed in 616. Follow-up may include, for example, determining if an update for the delivery (e.g., confirming the delivery) has been provided to the platform. Such an update may be data transmitted from an electronic device of the relationship based fulfillment user indicating that the data has been performed. Additionally or alternatively, the requesting user may provide data indicating that the delivery has been performed and that the item has been received (e.g., via the application or through another interface).

In certain embodiments, data may be provided confirming the delivery in the form of, for example, pictures of the item(s) picked up and/or dropped off at the agreed upon location, GPS data of an electronic device of the relationship based fulfillment user being within the area of the pick-up and/or delivery address (e.g., within a geofence around the pick-up and/or delivery address), the retailer confirming pick-up of the item (e.g., manually or automatically), and/or other indications of successful pick-up and/or delivery. In certain such embodiments, an estimated time of completion may be provided (e.g., from one of the users) and/or determined and if the fulfillment has not been performed within a threshold period of time, 616 may be performed.

In various embodiments, follow-up in 616 may include providing a message to the requesting user and/or the user performing the fulfillment to request confirmation of whether fulfillment has been performed. Additionally or alternatively, the retailer may be contacted to determine if the item has been picked up. It is appreciated that, as described herein, any contact with the retailer may be manual contact or may be contact via one or more applications of the retailer.

A response may be received in 618. The response may indicate whether fulfillment has been performed. If fulfillment has been performed, the technique may proceed to 620 and the item may be marked as delivered. The transaction may then be considered closed. In certain embodiments, compensation may then be paid to the fulfilling user. If delivery is not determined to be performed, additional follow-ups may be scheduled and performed and, thus, the technique may return back to 616.

Figure 7:
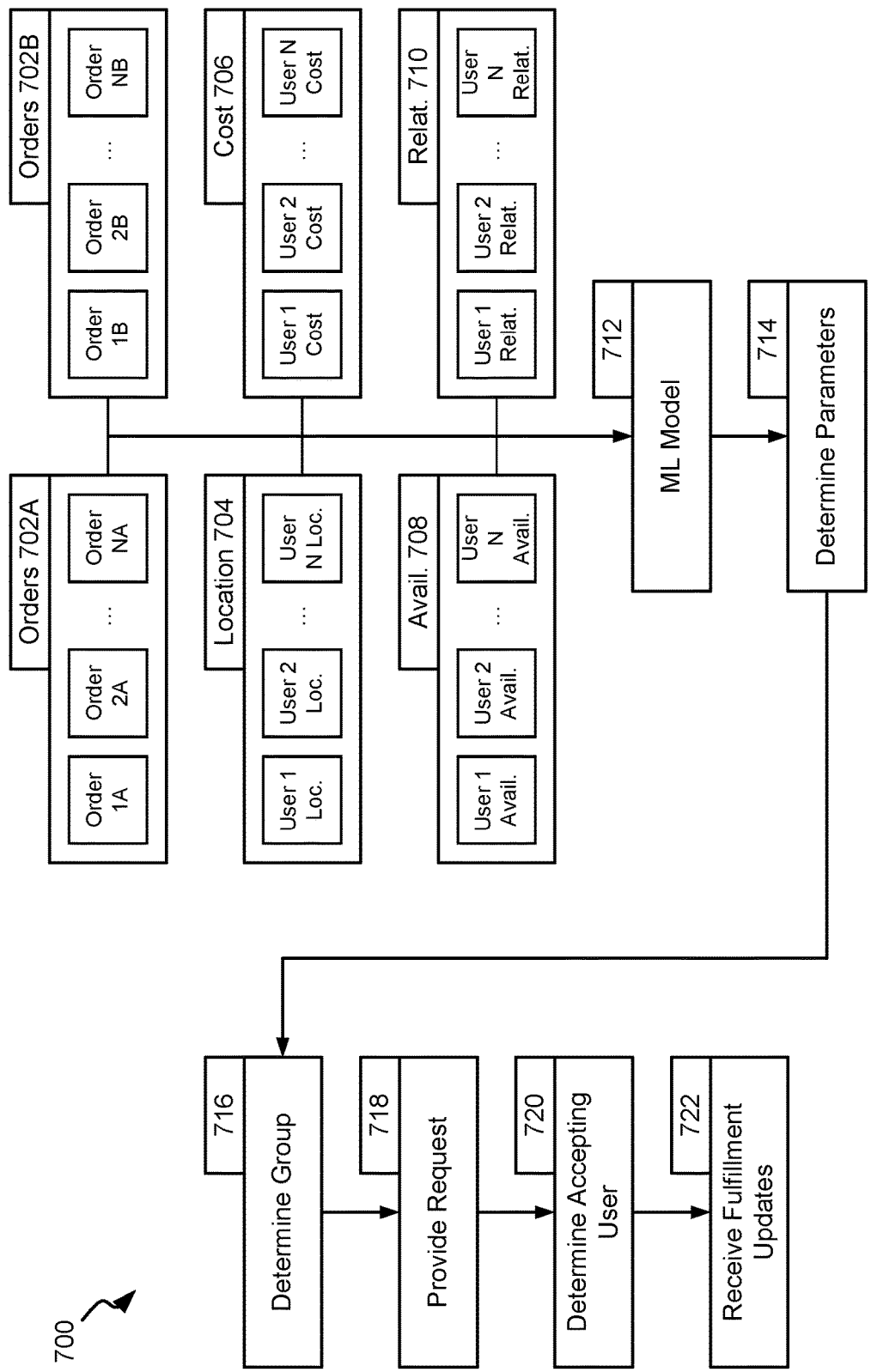
FIG. 7 is a process flowchart corresponding to determining a pick-up fulfillment user member, in accordance with some embodiments.

FIG. 7 is a process flowchart corresponding to determining a pick-up fulfillment user member, in accordance with some embodiments. FIG. 7 illustrates technique 700 that utilizes a plurality of categories of data (e.g., data stored within the databases described herein) to perform aspects of relationship based fulfillment. In certain embodiments, the data utilized may be limited in one or more aspects. Accordingly, for example, to determine pick-up candidates for relationship based fulfillment in a first area, only data associated with the area may be used.

Such categories of data may include data directed to orders 702A, orders 702B, location 704, cost 706, availability 708, and relationships 710. Each category of data may be associated with one or more specific users (e.g., users whose data is stored within user database 112). Orders 702A may be data directed to current orders that include requests for providing relationship based fulfillment. Orders 702A may include data directed to the vendor, the items ordered, the identity of the requesting user, the pick-up and/or delivery addresses, and/or other data.

Orders 702B may be data directed to various orders and/or transactions conducted by various users. Orders 702B may include data directed to the vendor, the items ordered, the customer, the pick-up and/or delivery addresses, and/or other aspects of such orders. Orders 702B may include data directed to some or all orders that are conducted within a platform. The historical data of orders 702B may influence (e.g., increase or decrease) the likelihood of a user being deemed appropriate to provide relationship based fulfillment for another user.

Orders 702B may include data directed to previously conducted orders. That is, information related to the items and quantity ordered, the customer, the merchant, and/or the user that provided relationship based fulfillment may be included as such data. Furthermore, the data may be categorized according to order category. Order category may include a category for the items as well as the time sensitivity of the orders (e.g., different types of items ordered may include different time sensitivity for delivery). In certain embodiments, time sensitivity may entail the timeframe that an order was delivered and the satisfaction rating given to the relationship based fulfillment, in order to determine whether such a delivery timeframe was appropriate. Furthermore, the category of orders may be associated with various users, whether the user is the ordering user, the user providing relationship based fulfillment, and/or another such user. Accordingly, whether certain users gravitate towards certain types of orders or prefer providing relationship based fulfillment for certain types of orders may be determined from data of orders 702B. Such data may be prepared for machine learning model 712 in a manner appropriate for the determination of relationship based fulfillment candidates.

Location 704 may include various geofences, as described herein, as well as a current location of the user. The geofences may each be associated with one or more users. Alternatively or additionally, location 704 may be data associated with specific locations (e.g., addresses, areas, routes, and/or other locations) that are associated with one or more such users. The various locations may influence the likelihood of a specific user being determined to be suitable to provide relationship based fulfillment for another user. Accordingly, for example, if two users are determined to have home addresses that are close to each other, the likelihood of one of the users being deemed appropriate to provide relationship based fulfillment for the other user may become greater. Furthermore, similar work locations, or a requesting user having a location (e.g., work or home) that is along another user's commute may also increase the likelihood of the other user being deemed to be appropriate for relationship based fulfillment.

Variously, the geofences, specific locations, and/or routes may be provided as separate points of data and/or may be included as a single data package that may be associated with a specific user. Thus, in certain embodiments, various location data may be prepared for machine learning model 712 in a manner appropriate for the determination of relationship based fulfillment.

Cost 706 may include internal cost structures and cost factors associated with one or more such users. For example, in certain embodiments, users may be associated with a cost factor that is associated with providing service. Cost 706 may include data related to cost compensation for various users, such as whether a user accepted or rejected a relationship based fulfillment request and the cost compensation offered during the request (which may be associated with distances of performing the requests) and/or the willingness of the user to receive compensation (e.g., fixed compensation) in various currencies (e.g., cryptocurrencies). Such cost compensation may include compensation in various currencies (e.g., U.S. dollar, Euros, and/or other currencies) as well as other forms of compensation such as rebates, cryptocurrency, gift certificates, and/or other such forms of compensation. In certain embodiments, cost compensation may be determined for each occurrence of relationship based fulfillment while, in other embodiments, cost compensation may be fixed. In certain such embodiments where cost compensation is fixed, the disturbance to the daily routine or travel of a user may be standardized or minimized instead, in order to provide equal incentive for all relationship based fulfillment.

In other embodiments, costs for users for providing service to different other users may vary. For example, if two users are determined to have a personal relationship, the cost for one of the users to provide relationship based fulfillment to the other may be determined to be less and, thus, such relationships may also be included in the data of cost 706. Additionally or alternatively, certain users may be determined to have a personal interest in certain product lines or categories and the cost factor for such products may accordingly be adjusted downward to reflect such interest.

In certain embodiments, the various data related to the cost factor may be provided as raw data (e.g., what the user's interest is actually at) or may be a set adjustment (e.g., an interest in a first category may adjust the cost factor 30% downward for providing relationship based fulfillment for items of that category). In certain embodiments, machine learning model 712 may adjust the cost factor, cost data, and other data described herein and, thus, provide for a feedback loop. Accordingly, the various cost factors of cost 706 may be prepared for machine learning model 712 in a manner appropriate for the determination of relationship based fulfillment.

Availability 708 may include data directed to availability of various users. Availability data may, thus, be associated with an individual user. Availability 708 may include the daily schedules of the users, the routes taken by the users, and/or other such data. Furthermore, availability 708 may be updated based on the actions of the users. For example, the users may indicate on an application of their user device whether they are available for relationship based fulfillment and data in availability 708 may accordingly provide such indication.

Relationship 710 may be data directed to the various relationships of users, as described herein. For example, the contact list, social media contacts, exchanged messages, and/or other data may be used to determine relationships between users, as described herein. Relationship 710 may additionally include data indicating the nature of the relationship, such as whether the relationship is familial, friendly, work related, acquaintances, and/or another type of relationship. Such relationships may be provided as numerical rating or as a modifier to the relationship data. In other embodiments, the different categories of relationships may be provided as data with different relationship markers.

The data of 702B to 710 may be provided to machine learning model 712. Machine learning model 712 may utilize data 702B to 710 as inputs and may determine parameters 714 and determine groups 716 from the inputs. Determining parameters 714 may include determining the factors that would be utilized in determining the recommendation groups in 716. Such groups may be groups of candidate users for providing relationship based fulfillment for one or more orders 702A. Thus, for example, the parameters of 714 may include cost parameters (e.g., the importance of cost to determining that a user is an appropriate user for providing relationship based fulfillment), distance parameters (e.g., the important of how close a user is to a requested pick-up and/or to a drop-off location), relationship parameters (e.g., how important it is for a requesting user to have a specific personal relationship to the user providing relationship based fulfillment). As described herein, the parameters determined in 714 may be global (e.g., applies to all users on a platform) and/or specific to a user. In certain embodiments, the various parameters may be prioritized according to rankings determined by machine learning and/or through inputs from an administration of the platform. Thus, for example, one of a distance of a candidate user to a requested pick-up location or a distance of a candidate user to a requested drop-off location may be considered to be of greater importance or both may be considered equally important.

Based on the parameters determined in 714, one or more groups may be determined in 716. Such groups may be potential candidates for providing relationship based fulfillment for one or more orders 702A. For example, each order within orders 702A may be orders that request relationship based fulfillment. One or more groups of users within the platform may be provided and/or contacted as potential candidates for providing relationship based fulfillment for each of those orders. In certain embodiments, a plurality of groups may be provided and/or contacted as potential candidates for providing relationship based fulfillment, as described herein.

Thus, after determination of the groups in 716, requests may be provided in 718. Such requests may be, for example, provided to one or more members of the groups or one or more groups as determined in 716. For example, each order may include one or more groups and members within a first group may first receive a request to provide relationship based fulfillment for the order. If no response is received from any member of the first group, members within a second group may then receive a request to provide relationship based fulfillment.

In 720, one or more users may accept the request to provide relationship based fulfillment. If one user accepts, that user may be selected to provide relationship based fulfillment. If a plurality of users accept, one of the users may be selected to provide relationship based fulfillment, according to the techniques described herein. Data may then be provided to each of the accepting users to indicate whether they were selected to provide the relationship based fulfillment or not and, if they are selected, instructions for pick-up and/or delivery of the order.

After the selected user indicates that relationship based fulfillment is being performed, performance of the relationship based fulfillment may be tracked in 722. Data may thus be periodically received from the user device of the user providing relationship based fulfillment, or the device of another user (e.g., the user requesting the fulfillment). Such techniques may be similar to the techniques of, for example, 614 to 620 of FIG. 6 as well as other techniques described herein.

Figure 8:
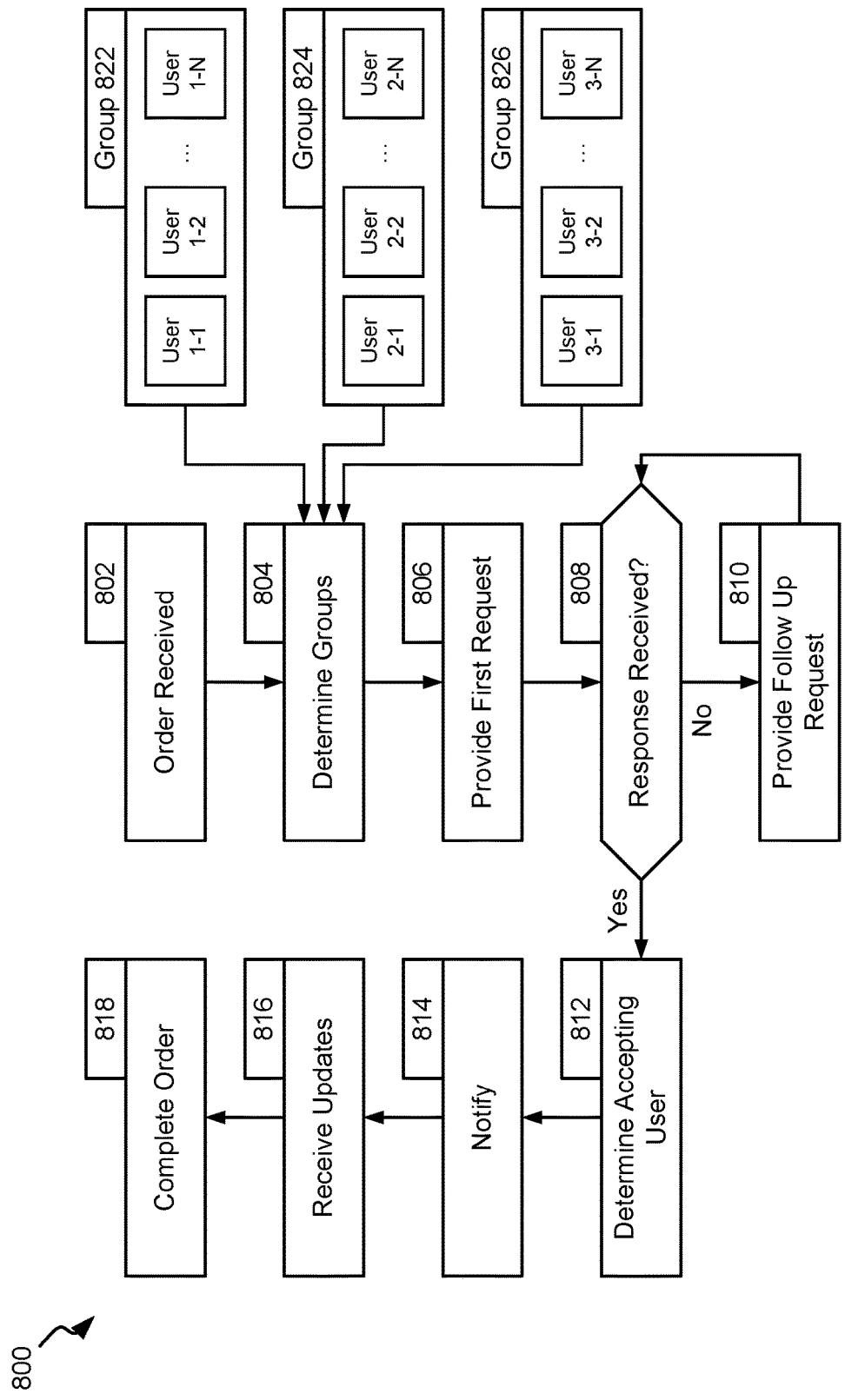
FIG. 8 is a process flowchart corresponding to determining pick-up fulfillment groups and a pick-up fulfillment user member from the pick-up fulfillment groups, in accordance with some embodiments.

FIG. 8 is a process flowchart corresponding to determining pick-up fulfillment groups and a pick-up fulfillment user member from the pick-up fulfillment groups, in accordance with some embodiments. FIG. 8 illustrates technique 800 that determines an appropriate user for providing relationship based fulfillment.

In 802, an order may be received by a platform and may include a request for relationship based fulfillment, as described herein. In certain embodiments, orders may automatically request relationship based fulfillment. As such, any order through a certain platform may automatically request relationship based fulfillment.

In 804, candidate groups for providing the relationship base fulfillment are determined. The candidate groups may be determined through machine learning techniques utilizing the inputs and techniques described herein, such as in FIG. 11. A plurality of candidate groups may be determined. Thus, for example, groups 822, 824, and 826 may be accordingly determined in 804. Each of groups 822, 824, and 826 may include one or more candidate users for providing relationship based fulfillment.

Each of the users within groups 822, 824, and 826 may be determined based on various factors described herein. In certain embodiments, the platform may limit the amount of possible candidates determined by, for example, limiting the pool of potential candidates to one associated within a specific geographical area. Thus, if a pick-up location for relationship based fulfillment is in a first area (e.g., city district, city, or county), a drop-off location is in a second area, and third and fourth areas separate the first and second areas, only users that are associated with one or more of the areas (e.g., users whose user data indicates that they live, work, visit, or travel through one or more of the areas) may be potential candidates for providing relationship based fulfillment. Additionally or alternatively, only users that have a relationship with the requesting user may be a potential candidate for providing relationship based fulfillment.

In certain embodiments, an estimated cost for providing relationship based fulfillment may be determined for various potential candidate users. The costs may be determined with the machine learning models described herein. Determination of the cost may include determination with the various data (e.g., the order data, location data, historical cost data, availability data, and/or relationship data) described herein. For example, the distance that the candidate user is currently located at or will be in the future (e.g., when the candidate user has arrived at work) may affect the cost determination based on, for example, the estimated distance or time that the candidate user would need to travel to pick-up or deliver the order. The cost may be further affected based on data from other categories.

Additionally or alternatively, the data may be used by the machine learning model to, for example, determine an estimated time for delivery associated with the candidate user, determine a relationship between the candidate user and the requesting user, determine a level of convenience for performing relationship based fulfillment for that request for the candidate user, and/or other such determinations. In certain embodiments, such determinations may be in the form of a numerical rating, graded rating, and/or provided in another manner.

Such determinations may allow for determinations of the compositions of groups 822, 824, and/or 826 as well as other groups. In certain embodiments, groups 822, 824, and/or 826 may be determined according to the factors described herein. The factors may be assigned importance ratings based on that desired by the platform or the administrator of the platform, and/or the factors may be ranked accordingly by the machine learning model to provide optimized group determinations.

As such, for a machine learning model that mostly or fully optimizes based on disturbance to a user's schedule, group 822 may be the group with the lowest disturbance to their schedule, while group 824 may include candidate users that may be moderately disturbed, and group 826 may be users that may need to go out of their way. For a machine learning model that mostly or fully optimizes based on relationship, group 822 may include users with the closest personal relationship to the requesting user (e.g., family or friends), group 824 may include users with less close relationships (e.g., co-worker or acquaintance), and group 826 may include users that have no relationship with the requesting user. Other machine learning models may optimize for other factors and/or a combination of factors.

In certain embodiments, groups 822, 824, and 826 may be candidate groups determined according to the techniques described herein. In certain embodiments, group 822 may include higher quality (e.g., higher likelihood of acceptable) candidates than group 824. Group 824 may also include higher quality candidates than group 826. Other embodiments may include other order groupings.

In 806, a first request is provided. The first request may be, for example, requests to each user member of group 822 requesting confirmation of whether they're interested in providing relationship based fulfillment for the order of 802. The requests to each member of group 822 may be provided as a batch.

In 808, a determination is made that a threshold condition has been met. The threshold condition may be, for example, that a threshold period of time (e.g., 5 minutes, 10 minutes, 30 minutes, an hour, or another time period) has passed since the requests of 806 were provided. Upon such a determination, a further determination is made in 808 as to whether a threshold number of responses have been received. The threshold number of responses may be, for example, one or more responses from candidate users that a request was provided to. If the threshold number of responses is received, the technique may continue to 812. Otherwise, if a threshold number of responses is not received, the technique may continue to 810.

If the threshold number of responses is not received, a follow up request may be provided in 810. The follow up request may be, for example, a request to each user member of another group (e.g., group 824 or group 826) requesting confirmation of whether they're interested in providing relationship based fulfillment for the order of 802. In certain embodiments, the platform may move to contacting users of lower quality groups if a threshold number of responses is not received in 808 (e.g., members of group 822 may first be notified in 806 and, if a threshold number of responses is not received, members of group 824 may be notified in 810) in order to increase the potential pool of users that may provide relationship based fulfillment. Such a technique may more efficiently utilize the resources of server devices by, for example, saving initial resources by contacting candidate users in batches instead of all at once. The technique may then return to 808 to determine if the threshold number of responses has been received. If, in 808, it is determined that there are no accepting candidate users and no additional candidate users to contact, a credit or monetary compensation may be offered to the requesting user to allow for the requesting user to fulfill the order themselves.

If the threshold number of responses has been met in 808, the technique may proceed to 812 and determine the user accepted to provide relationship based fulfillment. The user selected in 812 may be based on one or more factors. Thus, a certain embodiment may select the lowest cost user that accepted. Another embodiment may select the user with the closest relationship to the requesting user. A further embodiment may select the user that has a location (e.g., current, work, home, and/or commute route) that is closest to the pick-up and/or drop-off location or may detour the least amount of distance from their daily routine to perform the relationship based fulfillment. In certain embodiments, one or more of such factors may be utilized in 812. In certain embodiments, a machine learning model may be utilized to determine the accepted user in 812.

Once the accepted user is determined in 812, the various responding users may be notified in 814. Accordingly, the accepted user may be notified that the user has been accepted to provide relationship based fulfillment in 812 via a SMS message, message through an application, phone call, e-mail and/or other technique of contacting and notifying the accepted user. Other users that responded, but were rejected for providing relationship based fulfillment, may also be contacted in 812 via the techniques described herein, informing them of their rejection. In certain embodiments, users that did not respond may also be informed that the request for relationship based fulfillment has been fulfilled, via the techniques described herein.

In 816, updates may be received that are directed to the status of the relationship based fulfillment, as described herein. Such updates may include updates as described herein, related to, for example, pick-up, transit, and/or drop-off of the items for relationship based fulfillment. Once the order has been drop-off and confirmation provided that it has been received, the order may be deemed to have been completed in 818 and funds released, as described herein.

Figure 9A:
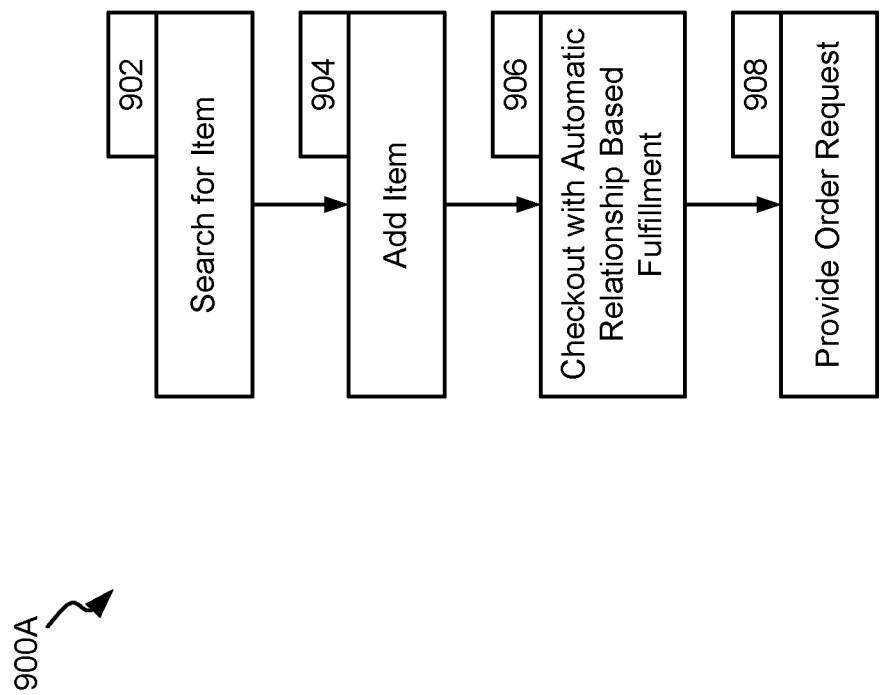
FIG. 9A is a process flowchart corresponding to a user conducting a relationship based fulfillment transaction, in accordance with some embodiments.

FIG. 9A is a process flowchart corresponding to a user conducting a relationship based fulfillment transaction, in accordance with some embodiments. FIG. 9A illustrates technique 900A for a requesting user to provide a relationship based fulfillment request. Technique 900A may, fully or partially, be performed on a user device.

In 902, a user may search for or be suggested/pushed/recommended a product for purchase (e.g., via the application, a notification, text message, e-mail, or other communications medium). The search may be performed within an application of the user device. The user may search for one or more terms and/or browse through one or more stores on a platform with the user device. For searches, the user device may then provide data to a server device indicating the search term. The server device may then perform a search (e.g., within its databases) and transmit data that includes the search results to the user device. If the user is browsing through a store, the server device may provide data as to what is available for purchase within the store to the user device.

In certain embodiments, the user device may transmit location data to the server device indicating the location of the user device. The server device may receive the location data and determine the current location of the user device. The search performed by the server device may then be geographically limited to a radius (e.g., 10 mile radius), time of travel (e.g., within 20 minutes of travel), or other consideration around the location of the user device. In other embodiments, the location data may include the work and/or home location of the user device. Such locations (as well as spatial data and the user's daily schedule) may be stored within the user database. The search performed by the server device in response to the search request from the user device may be geographically limited to such locations and/or may additionally include such locations within its determined geographical limits.

In 904, the user may add an item to an electronic shopping cart and check out the cart in 906. Relationship based fulfillment may be automatically selected so that the user does not need to provide a request for relationship based fulfillment. The user may confirm the items to be ordered during check out, provide payment data, shipping address, and/or authentication information, as well as other such data.

Once checkout has been confirmed, the order request may be provided to the server device in 908 and processed by the platform and one or more relationship based fulfillment candidate users may be identified and contacted. A user for providing relationship based fulfillment may be determined from accepting candidate users. If no appropriate candidate users accept and no additional candidate users can be contacted, a credit or monetary compensation (in any currency described herein) may be offered to the requesting user to allow for the requesting user to fulfill the order themselves.

Figure 9B:
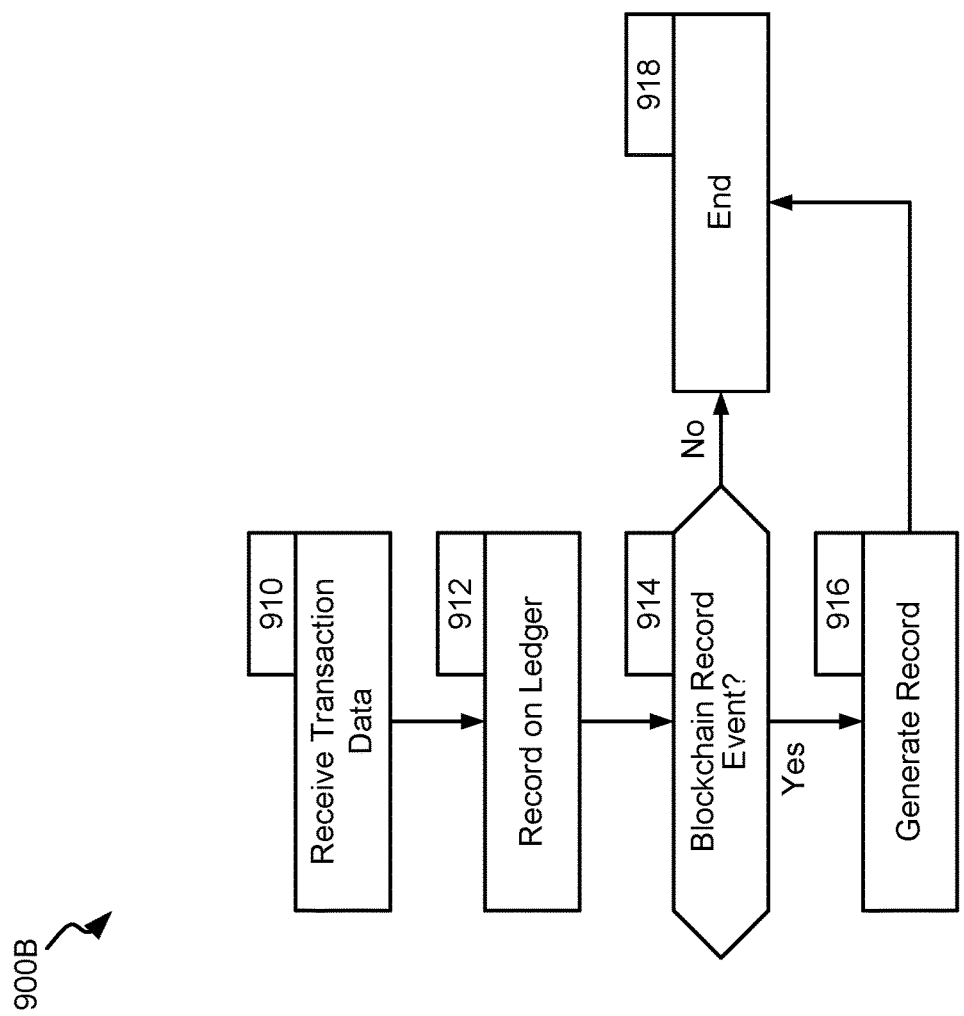
FIG. 9B is a process flowchart corresponding to a coin allocation and blockchain recordation technique, in accordance with some embodiments.

FIG. 9B is a process flowchart corresponding to a coin allocation and blockchain recordation technique, in accordance with some embodiments. FIG. 9B illustrates method 900B for determining if a blockchain coin record event has occurred and for generating records within the blockchain accordingly. Method 900B may be performed with one or more components and/or systems described herein. It is appreciated that, in various embodiments, portions of method 900B may be performed with one or more of components described herein.

In 910, transaction data may be received. Transaction data may be, for example, data associated with an allocation, purchase, exchange (e.g., exchange of an amount of coins for currency), transfer (e.g., transfer of coins to an account external to the platform), and/or other such transaction (e.g., associated with the coin). The transaction data may indicate details of the transaction, such as whether it is a request for exchange or transfer, a transaction, an allocation, the parties of the exchange (e.g., whether the user is requesting an exchange on the open market or whether it is a transaction between two or more parties and the identities of the parties), the amount associated with the exchange, and/or other such data.

In 912, the details of the transaction (e.g., parties involved, amount involved, items purchased, time of transaction, fulfillment provided, status of transaction such as open, closed, and/or pending, and/or other such details) may be determined and recorded within a ledger. The ledger may be stored within wallet module 126. The ledger may record the allocations and/or transactions on the platform. The ledger may be configured to receive tokens associated with relationship based fulfillment and determine details of the transaction and/or relationship based fulfillment from the received token and such details may be incorporated into the ledger entry.

As described herein, the platform may allocate coins to users performing relationship based fulfillment and/or conduct transactions utilizing coins (e.g., as payment for goods or services). The users, merchants, and/or other accounts holders of the platform may include wallet accounts on the platform (e.g., such that their account data is stored within wallet module 126). As such, the users, merchants, and/or other accounts holders may engage in transactions on the platform (e.g., buying/selling of items) and payment may be provided through wallet accounts or other services on the platform.

In 914, a determination may be made as to whether a blockchain record event has occurred. A blockchain record event may be, for example, any event where an amount of the coin is transferred out of databases of the platform and/or transferred to an account that is not hosted on the platform. Thus, for example, if an amount of coin is transferred to an external account (e.g., of a backstop entity, an external wallet account, and/or another external account), such a transaction may be determined to be a blockchain record event. In certain embodiments, a determination may be performed as to whether an account associated with the transfer has been noted on the blockchain. If the account is not present on the blockchain, a blockchain record event may be determined.

In transactions where payment is provided between wallet accounts of the platform, where payment is provided to a user performing relationship based fulfillment where the user is allocated coins as compensation, and/or for another transaction where an amount of coin is not transferred or only transferred between wallet accounts stored on the platform (e.g., between wallets within wallet module 126), a determination may be made that a blockchain record account has not occurred. However, if an exchange is requested where a backstop entity needs to provide a backstopped exchange (e.g., based on the exchange rate of the coin being below a threshold exchange rate), where an exchange leads to the coins being provided to an external wallet, where a transfer request moves the coin to an external wallet, and/or another such transaction with the coins being provided to an account that is stored outside of the platform (e.g., not within a wallet of that platform), a determination may be made that a blockchain record event has occurred.

If a blockchain record event has occurred, details of the transaction may be recorded, in 916, within a record of the blockchain (e.g., sovereign chain), according to the techniques described herein. A handshake may then corresponding be performed between the ledger and the blockchain and the ledger may provide details of the blockchain record event to the blockchain. Thus, the ledger may provide details (e.g., the amount of the transaction, the party in possession of the amount, the external wallet that the amount belongs to, the transaction that resulted in the transfer, and/or other such details) that may be recorded on a record of the blockchain. As will be appreciated, the blockchain may include a plurality of records and records may be periodically generated. In certain embodiments, such as when the account of a transferring/requesting/receiving user is not present on the blockchain, the account may be accordingly created within the records of the blockchain.

Figure 10:
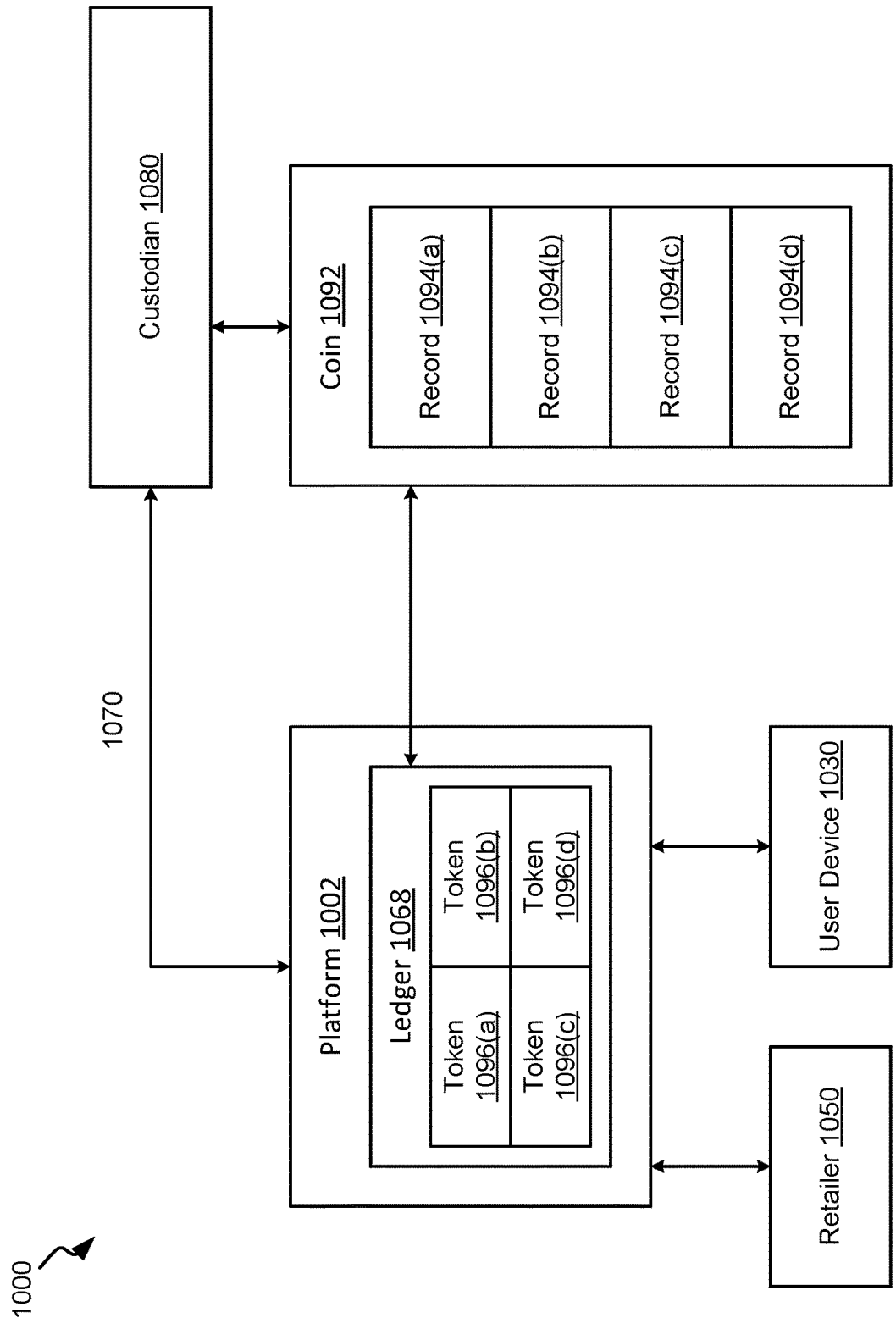
FIG. 10 illustrates a block diagram for a coin allocation and blockchain recordation system, in accordance with some embodiments.

FIG. 10 illustrates a block diagram for a coin allocation and blockchain recordation system, in accordance with some embodiments. FIG. 10 illustrates system 1000 that includes platform 1002, user device 1030, retailer 1050, custodian 1080, and coin 1092. Communications between the various components of system 1000 may be via communications channel 1070, which may include any communications techniques described herein. Platform 1002, user device 1030, retailer 1050, and custodian 1080 may be similar to platforms, user devices, retailers, and/or custodians described herein.

In certain embodiments, platform 1002 may include ledger 1068. Ledger 1068 may be configured to indicate the balance of one or more accounts associated with the user of platform 1002. Such users may be compensated for performing relationship based fulfillment and such compensation may be provided to user accounts tracked by ledger 1068. The users may additionally utilize the balance within the accounts to purchase items from retailers on platform 1002.

In certain such embodiments, various transactions may be requested and/or tracked with tokens. Accordingly, for example, tokens may be generated when a relationship based fulfillment is requested (e.g., on a per order or per item basis). The token, or a copy of the token, may be provided to the user selected for relationship based fulfillment to track the progress of delivery. The tokens may indicate the parties of a transaction, such as the retailer, the customer, and the relationship based fulfillment provider. Tokens may be processed based on the status of the fulfillment. In certain embodiments, tokens may be received from relationship based fulfillment providers when relationship based fulfillment has been performed. The received token may indicate that the relationship based fulfillment has been performed. For example, the received token may be an updated token indicating the details of the delivery (e.g., the drop-off location, time, the area the item was left, and/or other such details). The updated token may be a token with updated data by, for example, a user device. In certain embodiments, ledger 1068 may receive the token and determine details (e.g., whether the relationship based fulfillment was performed) from the token. In other embodiments, ledger 1068 may, alternatively or additionally, store the tokens. In certain such embodiments, ledger 1068 may be updated with such tokens (e.g., the tokens 1096($a$) to ($d$) may be directly stored in various entries of ledger 1068 and used to update the various accounts of ledger 1068) and one, some, or all allocations, transfers, and/or exchanges involving one or more accounts on ledger 1068 may be documented on the tokens and stored within ledger 1068.

Coin 1092 may be a cryptocurrency associated with platform 1002. Thus, for example, coin 1092 may be a cryptocurrency configured for transactions on platform 1002 and/or allocated as compensation for performing relationship based fulfillment on platform 1002. Thus, users on platform 1002 may elect to provide or receive payment via coin 1092 for transactions and/or elect to receive allocations (e.g., a pre-determined amount) of the coin when providing relationship based fulfillment.

Coin 1092 may indicate the amount (e.g., the amount of coins) within circulation and may include any number of records, such as records 1094($a$) to 1094($d$). Records 1094($a$) to 1094($d$) may include data directed to transfers of coin 1092 or portions thereof. Thus, for example, records 1094($a$) to 1094($d$) may include data directed to the details of the transactions (e.g., parties involved, identity of the accounts of the parties involved on platform 1002, amount involved, items purchased, time of transaction, fulfillment provided, status of transaction such as open, closed, and/or pending, and/or other such details). In certain embodiments, as described herein, as the ledger may record all transactions within platform 1002, records 1094($a$) to 1094($d$) may be directed to transfers external to platform 1002 (e.g., transfers of an amount of the coin to a wallet external to platform 1002, transfers of an amount of the coin between different external accounts, and/or transfers of an amount of the coin back into platform 1002). The records of coin 1092 may be publicly available and/or available with limited access to one or more other parties.

In various embodiments, creation of one or more of records 1094($a$) to 1094($d$) may include validation of the details of the transaction. Thus, for example, a record may be a pending data record as platform 1002 confirms the details of the transaction. When platform 1002 confirms the details of the transactions, the pending record may be permanently recorded as a data record of coin 1092. In certain embodiments, platform 1002 may correct portions of the data record if certain details are inaccurate. Creation, confirmation, and/or correction of records of coin 1092 may be automatically performed by portions of the platform or systems as described herein. Thus, for example, wallet module 126 may be configured to write and/or confirm details of the records.

In certain additional embodiments, coin 1092 may include an overseer. The overseer may be configured to ensuring that records 1094($a$) to ($d$) (and, accordingly, the resulting balances) are valid. The overseer may be configured to prevent balance transfers greater than the number of coins in circulation from being performed.

Figure 11:
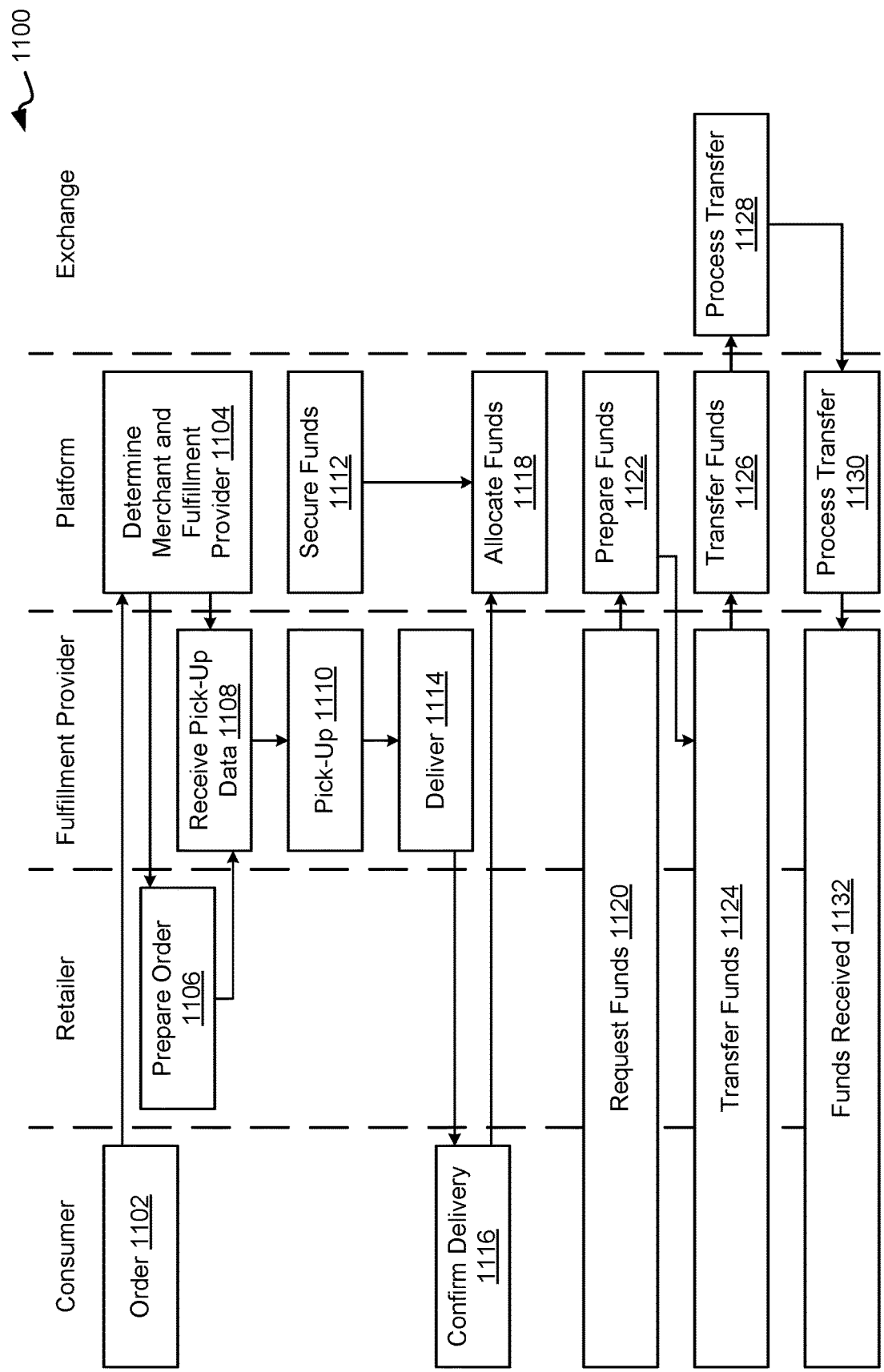
FIG. 11 is a process flowchart corresponding to a technique of coin allocation and blockchain recordation, in accordance with some embodiments.

FIG. 11 is a process flowchart corresponding to a technique of coin allocation and blockchain recordation, in accordance with some embodiments. FIG. 11 includes method 1100 for processing transactions utilizing cryptocurrency coins as described herein. Portions of method 1100 may be performed by one or more electronic devices and/or accounts associated with a customer, a retailer, a fulfillment provider (e.g., a relationship based fulfillment provider that may be another user), a platform, and/or an exchange (e.g., coin exchange).

In 1102, a customer may place or create an order. The order may be for goods and may be created or placed on the platform (e.g., on a merchant store within the platform). Thus, the customer may, for example, search for one or more products on the platform. The customer may, thus, search for one or more items within a virtual store of the retailer. Details of the order may be provided to the platform.

The platform may receive details of the order and determine a relationship based fulfillment provider in 1104, according to the techniques described herein. The platform may then transmit data to the retailer and potential relationship based fulfillment providers to arrange for fulfillment of the order. Accordingly, the retailer may receive the data and prepare the order in 1106 for pick-up by the relationship based fulfillment provider. Additionally, once a relationship based fulfillment provider has been determined, pick-up data may be provided to the relationship based fulfillment provider in 1108. The pick-up data may include data related to pick-up, drop-off, and/or other aspects of the order (e.g., special handling instructions). The data may, thus, allow for the relationship based fulfillment provider to perform the fulfillment. Thus, in 1110, the relationship based fulfillment provider may pick up the order from the merchant.

In 1112, after the relationship based fulfillment has begun, the platform may secure the funds for compensation of performing the relationship based fulfillment. Such funds may be in any currency described herein and may, in certain embodiments, include cryptocurrency in the manner described herein. Such funds may be held until the relationship based fulfillment has been confirmed to be performed.

In 1114, delivery of the items via relationship based fulfillment may be confirmed. Confirmation of the delivery may be through techniques described herein and may include, for example, GPS tracking of the location of the relationship fulfillment provider and the receipt of data indicating delivery (e.g., via confirmation with pictures of items dropped off). The consumer may confirm delivery and receipt of the items in 1116, according to the techniques described herein.

In 1118, based on the confirmation of delivery, the funds may be allocated. Allocation of the funds may include, for example, transfer of the compensation for performing relationship based fulfillment to a wallet of the relationship based fulfillment providing user (e.g., via recordation on the ledger). Before or after confirmation of delivery, payment may also be transferred to the retailer (e.g., from a wallet of the purchaser). Payment may be in any currencies described herein.

In 1120, a user may request exchange or transfer (e.g., to an external wallet) of an amount of coins (e.g., for the amount of the compensation received for and/or for a greater amount). The request may be provided at a time after delivery of the requested item has been finished, processed, and/or otherwise confirmed to be completed. As described herein, any one of the consumer, retailer, and/or fulfillment provider may request the exchange or transfer. The exchange or transfer may be for any amount of coins or a fraction thereof.

The platform may receive the request and prepare the funds for exchange or transfer in 1122. Preparation of the funds may include, for example, determining an exchange rate for the coin to another currency, determining a timeframe for when the funds are exchanged or transferred (e.g., due to limitations in the amount of transactions that may written to each record of the blockchain and the timeframe for generation of new records), and/or another such preparation. In certain embodiments, 1122 may be determine if the exchange or transfer may be prioritized. The exchange rate may be determined by, for example, requesting exchange rate data from an exchange engine and receiving exchange rate data accordingly. The exchange rate may be determined from the exchange rate data and may be compared to a threshold exchange rate. The threshold exchange rate may be any exchange rate (e.g., a 1 to 1 exchange rate between the coin and US dollars, or another rate). If the exchange rate is below the threshold exchange rate, a custodian or backstop entity may be contacted. Otherwise, the exchange may occur on an open market (e.g., where interested buyers may purchase the coins in return for payment in another currency, such as the currency being exchanged).

Based on the exchange rate, in 1124, funds may be exchanged or transferred. Thus, the funds for exchange or transfer may be received or earmarked by the platform from the wallet of the user. The platform, in 1126, may exchange or transfer the coins. The transfer or exchange on the exchange may be processed in 1128 and the requested currency exchanged for the amount of coins (e.g., from funds provided by a buyer). In examples where the exchange rate is below the threshold exchange rate, the backstop entity may be contacted to provide for a backstopped transfer (e.g., a transfer at an agreed upon exchange rate such as at the threshold rate). In various embodiments, the backstop entity may or may not directly purchase the coins at the agreed upon exchange rate.

In 1130, the transfer or exchange may be processed on the platform (e.g., on the blockchain). The ledger may be updated to reflect the transfer or exchange. Based on the details of the exchange (e.g., public or backstopped) or transfer, and due to the exchange or transfer being an external exchange or transfer (e.g., to the backstop entity or to an external wallet), the platform may determine that a blockchain record event has occurred. A blockchain record may be created indicating that an amount of the coin is associated with an external wallet of a party receiving the coin in the exchange or transfer. The coin record may, for example, indicate an owner of the transferred or exchanged amount of coin (e.g., the associated wallet account).

For exchange transactions, the platform may receive funds in the exchanged currency from the buyer or backstop entity. The funds from the exchange of the coin, in the desired currency, may be received by the platform and the exchanged funds may be provided to the wallet of the exchanging user in 1132.

Figure 12:
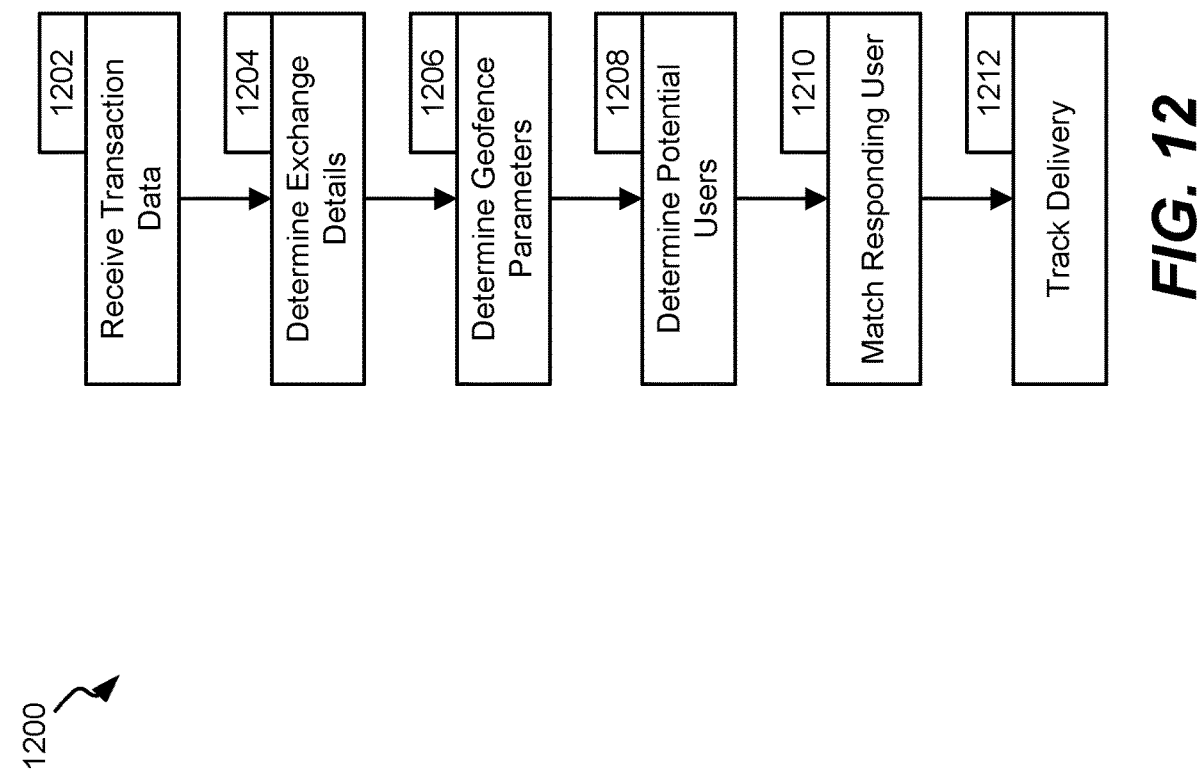
FIG. 12 is a process flowchart corresponding to a coin based community based fulfillment technique, in accordance with some embodiments.

FIG. 12 is a process flowchart corresponding to a coin based community based fulfillment technique, in accordance with some embodiments. FIG. 12 illustrates method 1200 for determining geofences and utilizing such geofences under a fixed cost compensation technique.

Typically, delivery methods determine a distance for delivery and determine compensation based on such distance. Such a technique requires multiple rounds of processing to 1) determine the distance of delivery and 2) determine the amount to be compensated to the deliverer for the delivery distance. The technique of method 1200 allows for a fixed cost compensation for relationship based fulfillment and for candidate relationship based fulfillment providers to be determined based on the fixed cost compensation. Fixed cost compensation allows for more resource efficient determination of potential relationship based fulfillment providers.

Furthermore, a plurality of currencies and/or cryptocurrencies may be utilized and offered as potential compensation to relationship based fulfillment providers. Method 1200 allows for the integration of the plurality of currencies in a fixed cost compensation manner through variations in geofencing technique. Various aspects of method 1200 may be implemented by one or more systems or system components, as described herein.

In 1202, transaction data may be received. Transaction data may indicate the details of a transaction, such as the identities of the consumer and the merchant, the items purchased, the pick-up and drop-off addresses, the amount of the transaction, the currency of the transaction, and the request for relationship based fulfillment.

In 1204, the exchange details may be determined. The exchange details may include, for example, an exchange rate for a currency (e.g., cryptocurrency) used to provide compensation for relationship based fulfillment. Thus, in 1204, the platform may request exchange rate data from an exchange engine. The exchange engine may provide such exchange rate data and the platform may accordingly determine the exchange rate for one or more currencies from the exchange rate data.

In 1206, geofence parameters may be determined. In certain embodiments, the geofence parameters may be determined based on the exchange rate determined in 1204. Thus, for example, in embodiments utilizing fixed cost compensation, the size and/or shape of the geofence may be determined according to the exchange rate. For example, certain embodiments may provide a fixed amount of coins for performing relationship based fulfillment. If the exchange rate for the coin is high (e.g., one coin may be exchanged for a high amount of another currency), the size of the geofence may be increased, while, if the exchange rate for the coin is low, the size of the geofence may be decreased. In certain embodiments, the shape of the geofence, may also be adjusted. In certain embodiments, the size of the geofence may be proportionally adjusted based on the exchange rate while, in other embodiments, the shape of the geofence may not be proportionally changed. Thus, an increase in the shape of the geofence may lead to a larger increase in certain areas of the geofence than other areas while a decrease in the shape of the geofence may lead to a larger decrease in certain areas than other areas. In accordance with the techniques described herein, geofences may be determined for various parties such as for the merchant, for the pick-up request, for various potential relationship based fulfillment providers, and/or for other parties.

Such a technique may allow for tailoring of a geofence to a fixed cost compensation for a relationship based fulfillment provider to maximize the number of potential relationship based fulfillment provider. Furthermore, such a technique may save processing resources that would otherwise need to be expended to determine a compensation for each potential provider (as the providers are all required to travel different distances). Instead, determining the geofence parameters is utilized instead of using processing to determine compensation for each potential provider. Such a technique requires significantly lower amounts of processing resources and network resources.

In 1208, based on the geofence determined, potential relationship based fulfillment providers may be determined. The determination of potential relationship based fulfillment providers based on the geofences may be according to the techniques described herein. In certain embodiments, one or more potential relationship based fulfillment providers may be determined who are outside of the geofences. Such potential relationship based fulfillment providers may be speculative potential relationship based fulfillment providers.

In 1210, one or more potential relationship based fulfillment providers may be matched to the request, according to the techniques described herein. Based on the matched potential relationship based fulfillment providers, a request to provide relationship based fulfillment may be provided to the various potential providers. Based on the request, a relationship based fulfillment user may be selected (e.g., based on acceptance from the users that the requests were provided for). In certain embodiments, the responding user may select one of a plurality of various currencies to receive compensation.

The user may then perform relationship based fulfillment and such fulfillment may be tracked in 1212. Once the relationship based fulfillment has determined to be performed, in 1212, compensation may then be provided to the delivery user. Thus, a compensation amount, in the selected currency, may be provided to the user providing the relationship based fulfillment once delivery has been confirmed.

FIG. 13 is an example ledger for coin based community based fulfillment, in accordance with some embodiments. FIG. 13 illustrates a ledger utilized for tracking transactions and user wallet accounts on the platform. Thus, the ledger may track the balance of users 1302 to 1310 through certain time periods. The ledger may be utilized for tracking transactions in one or a plurality of different currencies. In embodiments where the ledger tracks transactions in a plurality of different currencies, the ledger may include entries or portions for a combined amount (e.g., a combination of a plurality of currencies) and/or for each of the currencies.

As shown in FIG. 13, the ledger tracks the, inflow (e.g., amount brought from external sources, such as external bank accounts or other currencies), earning, and consumption of various users (e.g., users 1302 to 1310). In the example of FIG. 13, the tracking may be divided into weeks, but other embodiments may track accordingly to any timeframe. The ledger of FIG. 13 may allow for the tracking of the amount associated with users in various cryptocurrencies without requiring blockchain recordation events for every transaction, leading to quicker and less resource intensive transactions.

Figure 14:
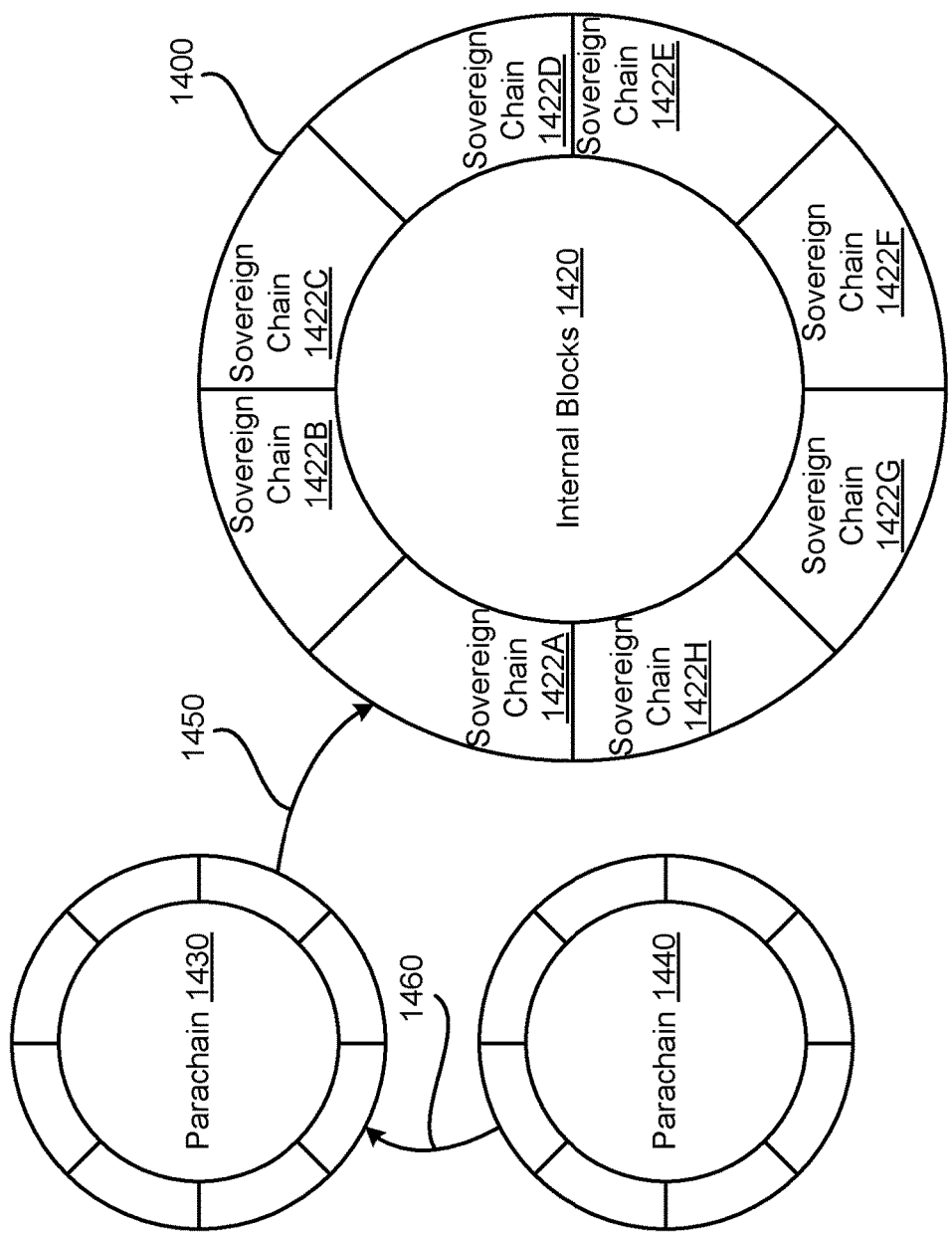
FIG. 14 is an example blockchain for coin based community based fulfillment, in accordance with some embodiments.

FIG. 14 is an example blockchain for coin based community based fulfillment, in accordance with some embodiments. FIG. 14 illustrates sovereign chain 1400 that may be a blockchain of a cryptocurrency associated with the platform. Sovereign chain 1400 may include internal blocks 1420 and sovereign chain nodes 1422A to 1422F.

Internal blocks 1420 may include various collator nodes, validator nodes, inputs, transactions, and/or other data blocks (e.g., for implementing the blockchain and/or coin). Internal blocks 1420 are configured to store records of transactions involving the coin. Thus, the records of internal blocks 1420 may include a history of the usage of the coin.

Sovereign chain nodes 1422A to 1422F may be the nodes of a blockchain and may include collator nodes and validators nodes. Collator nodes may be configured to finalize blocks (e.g., containing records) on the blockchain (e.g., within internal blocks 1420). Validator nodes may be configured to validate and/or bring blocks to the sovereign chain 1400.

Relay chain nodes 1422A to 1422F may be configured to interface with other chains such as parachain 1430, via bridge 1450. In such a manner, parachain 1430 may be added and integrated with sovereign chain 1400. Parachain 1430 may, thus, obtain a stake of the coins. Parachain 1430 may provide, for example, computing power, security protocols, and/or other processing abilities for sovereign chain 1400. In such a manner, the integration of parachain 1430 may increase the computing power for processing transactions within the platform. Parachain 1430 may be configured to interface with additional other parachains, such as parachain 1440, via bridge 1460. Accordingly, sovereign chain 1400 may be linked to a plurality of parachains, allowing for shared/increased computing resources and system complexity. In various embodiments, the parachains may be external or internal (e.g., internal to the platform) parachains. In certain embodiments, various bridges may allow for connection to other blockchains and/or services, such as exchanges, ledgers, and/or other services.

Figure 15:
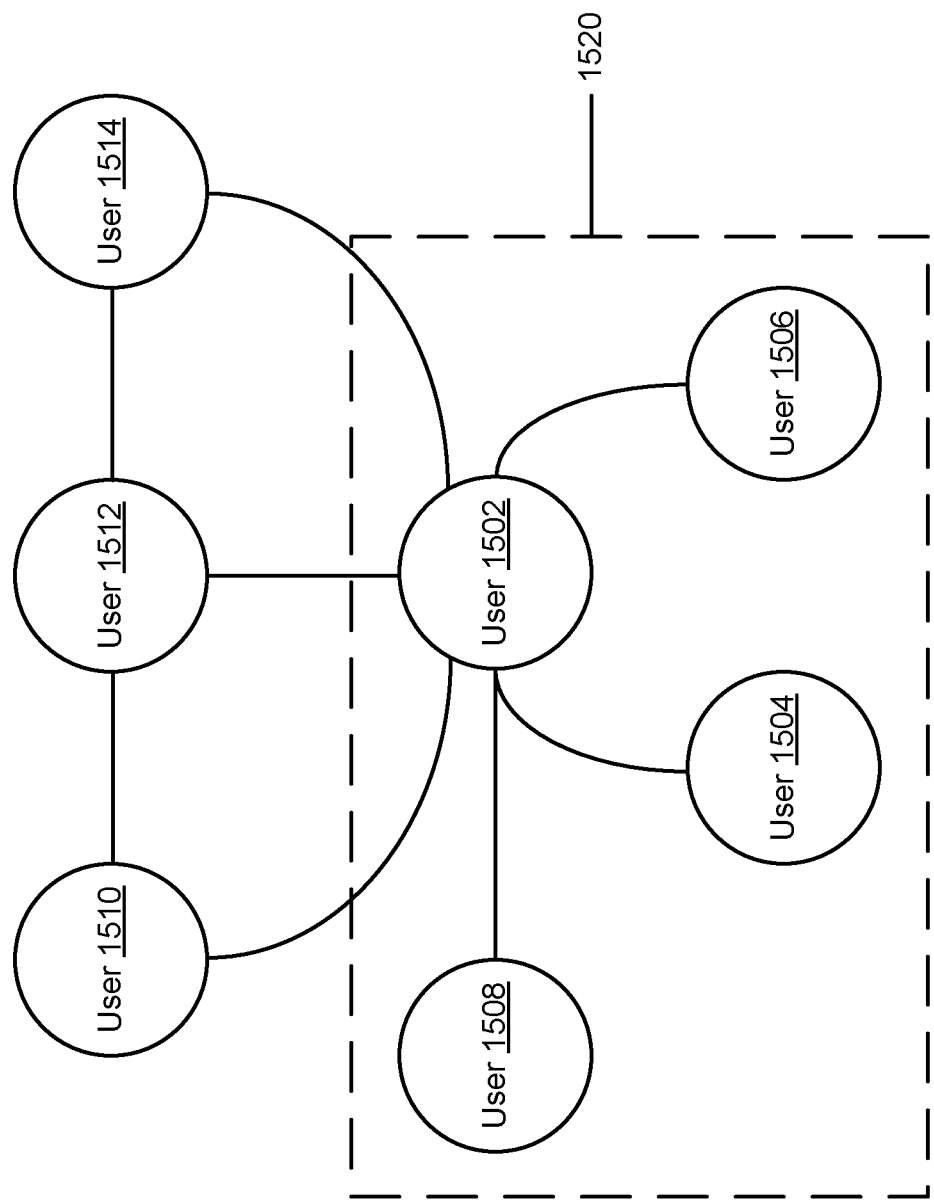
FIG. 15 is an example social determination representation, in accordance with some embodiments.

FIG. 15 is an example social determination representation, in accordance with some embodiments. FIG. 15 illustrates an example of user 1502 and users 1504 to 1514 associated with user 1502. Based on the actions of user 1502 and the relationship of user 1502 to users 1504 to 1514, a user trustworthiness or reputation may be determined. In certain embodiments, the user trustworthiness or reputation may be determined by machine learning techniques that may identify patterns in user relationships and user trustworthiness or reputation.

Thus, for example, if user 1502 first joins the platform, user 1502 may be associated with relationship network 1520 that includes other users 1504, 1506, and 1508. Based on the reputation ratings of users 1504, 1506, and 1508, the reputation of user 1502 may be accordingly adjusted. Thus, if the reputation ratings of users 1504, 1506, and 1508 are generally good, the reputation rating of user 1502 may be adjusted upward, or vice versa. In various embodiments, the reputation rating of user 1502 may be affected by adjustments in the reputation rating of users 1504, 1506, and/or 1508.

Furthermore, if user 1502 accepts and completes relationship based fulfillment, the reputation rating of user 1502 may also be adjusted upward. However, if user 1502 fails to complete relationship based fulfillment, the reputation rating of user 1502 may be adjusted downward. The platform may identify when connected users fail to perform actions and the downward reputation adjustment may apply to all users connected to the user that fails to perform actions. Such a technique allows for identification of Sybil attacks in which groups of users utilize their connections to manipulate networks. Identification of these groups, as they typically do not associate with well-meaning users, may allow for the tracking and/or blocking of these users. Furthermore, machine learning may be utilized to learn techniques utilized by such groups and monitor groups existing similar behavior.

In certain situations, if user 1502 is authenticated (e.g., provides further proof of their identity) and/or accepts the coin for compensation or transaction (e.g., indicating buy in to the ecosystem of the platform), the reputation rating of user 1502 may be adjusted upward.

In certain embodiments, user 1502 may additionally add users 1510, 1512, and 1514 to the user's circle. The reputation of the users 1510, 1512, and 1514 after user 1502 has added them to user 1502's circle may affect the reputation rating of user 1502. Accordingly, based on the various example, the reputation rating of user 1502 may be based on a variety of factors.

Figure 16:
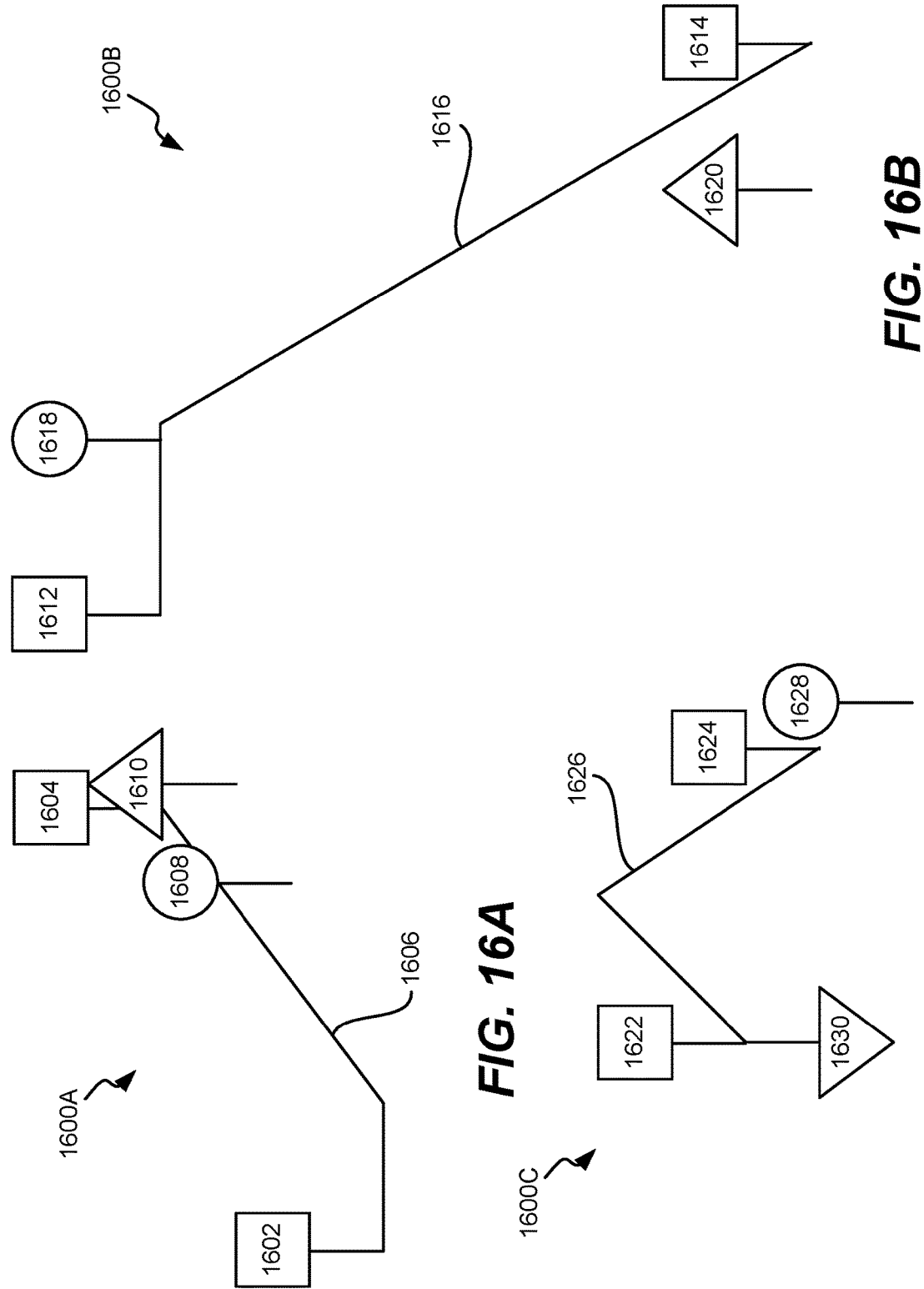
FIGS. 16A-C illustrate examples of relationship based fulfillment recommendations based on disturbances to daily routine, in accordance with some embodiments.

FIGS. 16A-C illustrate examples of relationship based fulfillment recommendations based on disturbances to daily routine, in accordance with some embodiments. In certain embodiments, the techniques described herein within FIGS. 16A-C illustrate examples in situations where cost compensation may be fixed for relationship based fulfillment. Thus, FIGS. 16A-C illustrate embodiments where, despite the differences in distance traveled to provide for the relationship based fulfillment, the disturbance to the daily routine or travel of a user is substantially similar.

FIG. 16A illustrates example 1600A that includes a daily starting/ending location 1602, travel destination 1604, pick-up location 1608, and drop-off location 1610. Daily starting/ending location 1602 may be, for example, a place of residence of a potential relationship base fulfillment provider. Travel destination 1604 may be, for example, a location that the potential relationship based fulfillment provider regularly travels to (e.g., a work location, school location, gym, church, or other location that the potential relationship base fulfillment provider is determined to regularly travel towards). The user (e.g., potential relationship based fulfillment provider) may be determined to regularly travel between starting/ending location 1602 and travel destination 1604 along route 1606. Pick-up location 1608 may be a location to pick up items for relationship based fulfillment and drop-off location 1610 may be the location that the items are requested to be delivered to.

Pick-up location 1608 and drop-off location 1610 may be locations proximate to route 1606. Pick-up location 1608 and drop-off location 1610 may be nearby each other. Thus, when traveling from starting/ending location 1602 to travel destination 1604, the potential relationship based fulfillment provider may only need to detour slightly to pick-up location 1608, travel to drop-off location 1610, and then travel to travel destination 1604. Accordingly, the disturbance to the daily travel schedule of the user, for providing relationship based fulfillment, may be low. Such a determination may be made even though the user may be detected to be at starting/ending location 1602 (e.g., in the morning before the user has left the starting/ending location) and, thus, physically far away from both pick-up location 1608 and drop-off location 1610.

FIG. 16B illustrates example 1600B that includes a daily starting/ending location 1612, travel destination 1614, route 1616 to travel between starting/ending location 1612 and travel destination 1614, pick-up location 1618, and drop-off location 1620. In example 1600B, pick-up location 1618 may be far away from drop-location 1620. Nonetheless, the disturbance to the daily travel schedule of the user in example 1600B for providing relationship based fulfillment may be similar to that of the disturbance in example 1600A. Though pick-up location 1618 and drop-off location 1620 are far away, pick-up location 1618 is on route 1616 and, thus, pick-up would not be a great burden on the user providing relationship based fulfillment. Drop-off location 1620 is only a slight detour from route 1616 and/or a slight distance away from travel destination 1614. Thus, though the delivery distance between pick-up location 1618 and drop-off location 1620 is much greater than the distance between pick-up location 1608 and drop-off location 1610, the disturbance to the daily schedules of the users may be similar. Accordingly, in certain embodiments, the cost compensation for the user providing relationship based fulfillment in examples 1600A and 1600B may be similar and, assuming all other factors being equal, the user in example 1600A and 1600B may be similarly likely to be provided with the respective relationship based fulfillment opportunities.

Similarly, FIG. 16C illustrates example 1600C that includes a daily starting/ending location 1622, travel destination 1624, route 1626 to travel between starting/ending location 1622 and travel destination 1624, pick-up location 1628, and drop-off location 1630. In example 1600C, pick-up location 1628 is nearby travel destination 1624 while drop-off location 1630 is nearby daily starting/ending location 1622 (e.g., is a neighbor of the user). Thus, in example 1600C, unlike in examples 1600A and 1600B, it would be relatively inconvenient for the user to provide relationship based fulfillment while traveling from starting/ending location 1622 towards travel destination 1624. However, the platform (e.g., with the aid of machine learning techniques) may determine that the user may be able to provide relationship based fulfillment when traveling from travel destination 1624 to starting/ending location 1622 (e.g., when getting off of work) and that the delay in providing relationship based fulfillment of waiting until the user is traveling back towards starting/ending location 1622 is acceptable. For example, a machine learning device may be trained to determine the category of goods of the order for which relationship based fulfillment is requested and that such a category of goods (e.g., household items, books, water, and/or other such categories) is able to accept a delivery delay. Thus, the platform may then determine that the user in example 1600C is acceptable for providing relationship based fulfillment and, furthermore, that the disturbance to the daily travel schedule of the user in example 1600C is low, similar to that of examples 1600A and 1600B.

Thus, the system and techniques described herein allow for relationship based fulfillment opportunities customized to a user's specific daily routes and routines. Furthermore, relationship based fulfillment providers may be provided with options of selecting one of a plurality of different currencies. In certain embodiments, the amount provided for compensation may be fixed or may be fixed for certain currencies (e.g., a pre-determined amount of coin may be offered for performing each relationship based fulfillment).

The systems and techniques described herein, normalize for impact to a delivery provider instead of normalizing for delivery distance and/or determine different amounts of compensation for different delivery distances. As such, each user on the platform may be provided opportunities while mostly driving their usual routes, and will be given optimal pickup/drop-off locations for them, based on driving and relationship factors.

Figure 17:
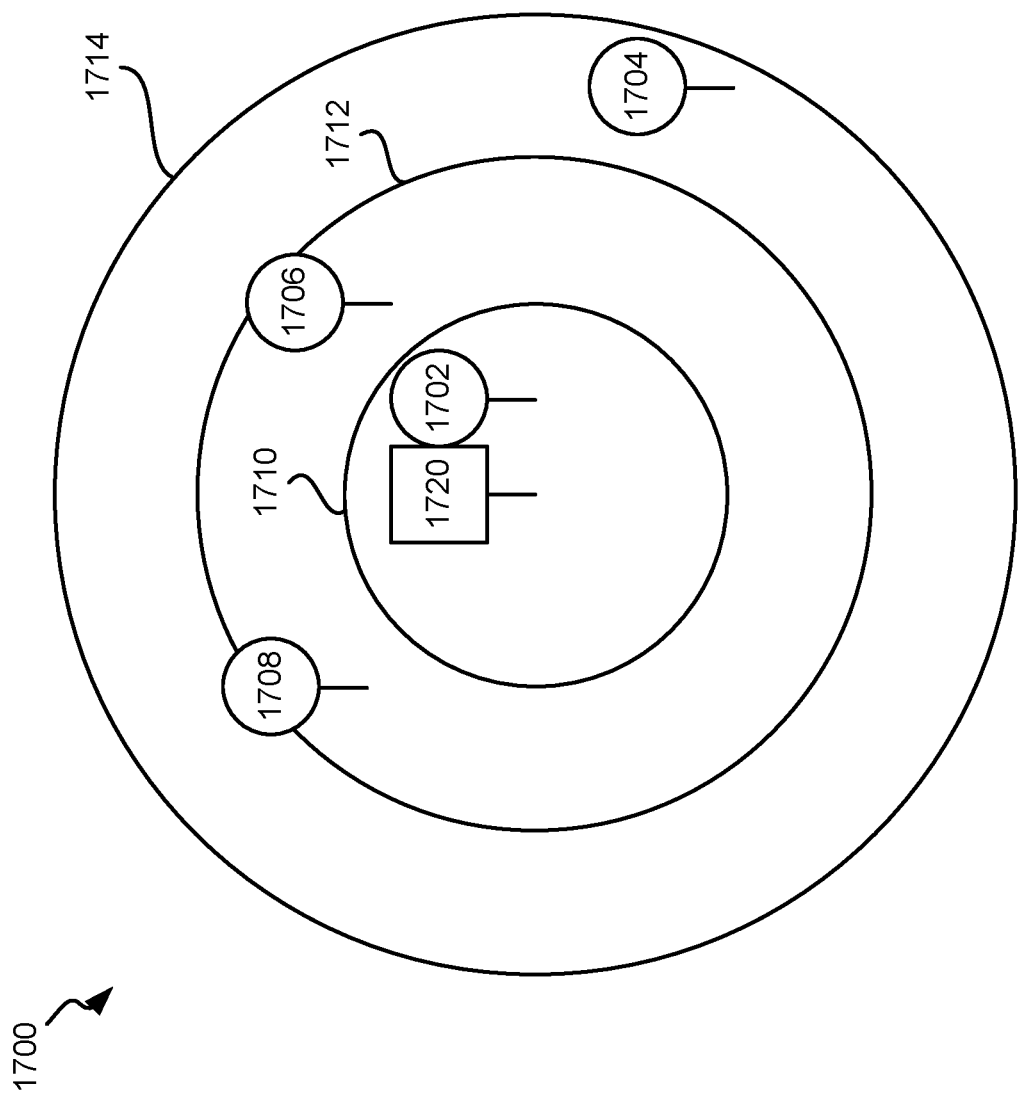
FIG. 17 illustrates an example of pick-up distance score determination, in accordance with some embodiments.
Figure 18:
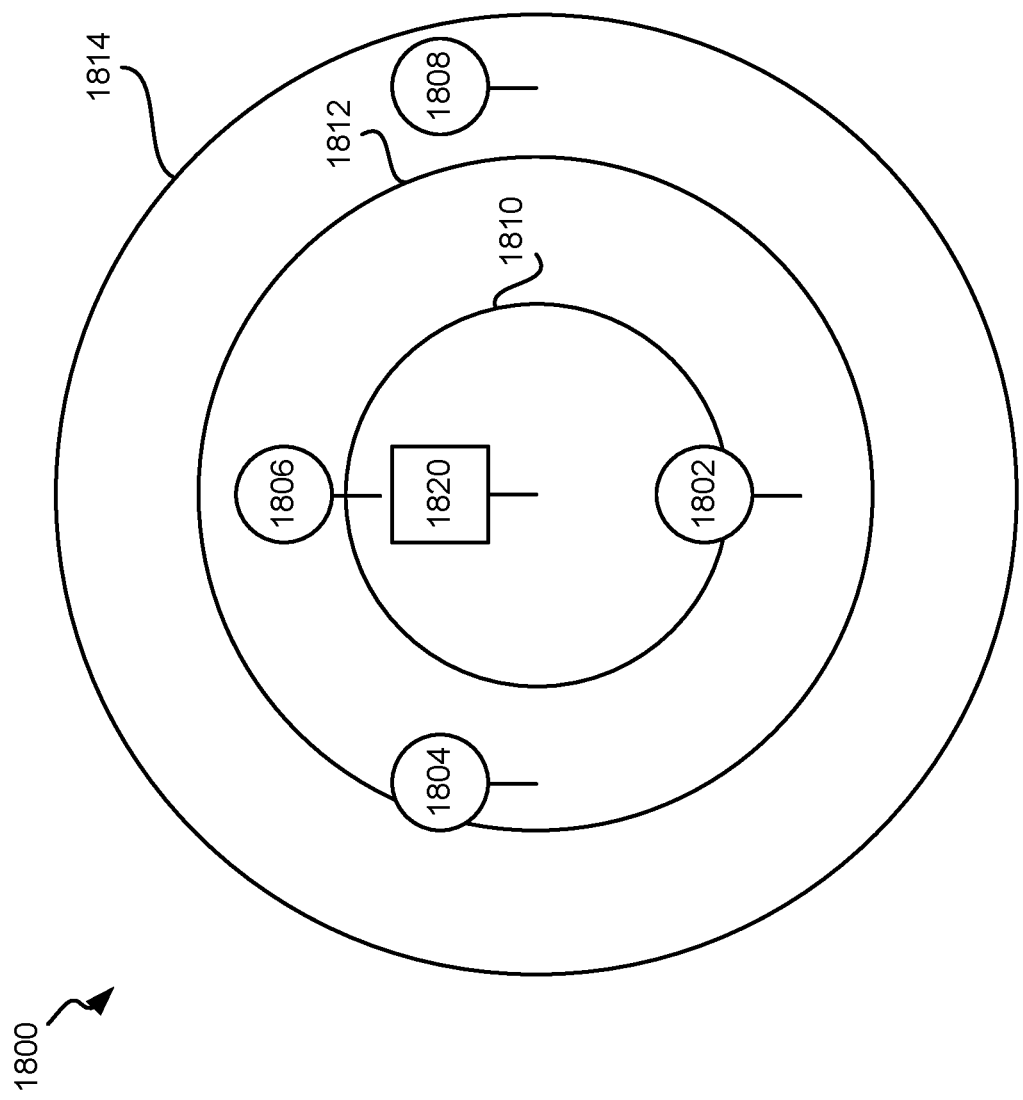
FIG. 18 illustrates an example of delivery disturbance score determination, in accordance with some embodiments.
Figure 19:
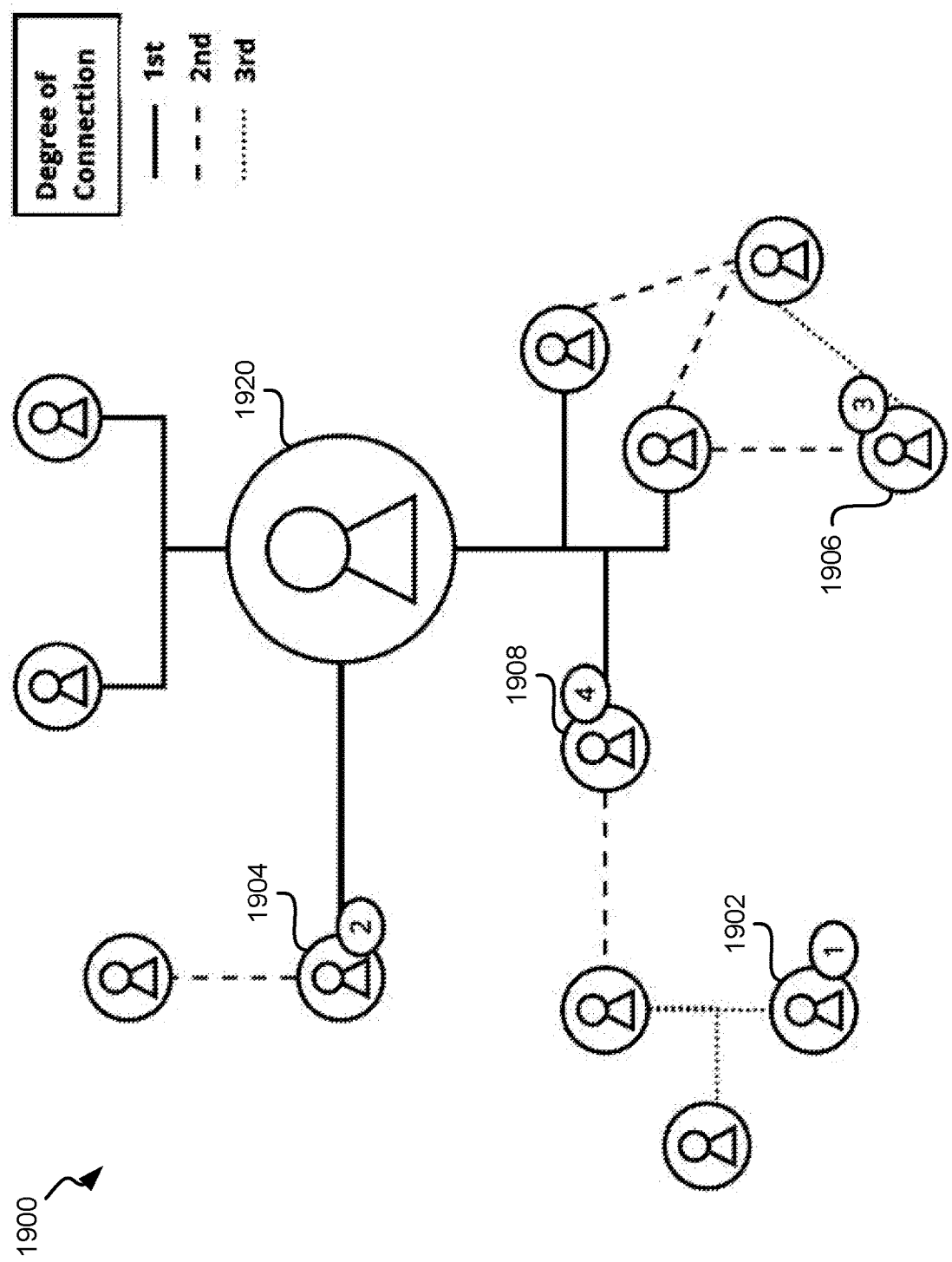
FIG. 19 illustrates an example of connection score determination, in accordance with some embodiments.

FIGS. 17-19 illustrate examples of determining scores for a user to provide relationship based fulfillment for various requests. In certain embodiments, the examples of FIGS. 17-19 may be utilized to determine various scores for users to provide relationship based fulfillment. Such scores may measure, for example, inconvenience to the user for providing relationship based fulfillment.

FIG. 17 illustrates an example of pick-up distance score determination, in accordance with some embodiments. FIG. 17 illustrates an example of determining a level of pick-up inconvenience to a user for performing relationship based fulfillment. In example 1700, user location 1720 may be a location of the user that is a potential relationship based fulfillment provider. In various embodiments, user location 1720 may be a current location of a user or may be a predicted location of a user at some future time (e.g., based on machine learning of the schedule of the user). In embodiments where user location 1720 is a predicted location, such a location may be fluid (e.g., along any portion of a forecasted route of the user). The distances from user location 1720 to pick-up locations 1702, 1704, 1706, and 1708 may thus be a relative distance from determined closest or most convenient (e.g., shortest amount of travel time) points along the determined route of the user.

As such, example 1700 may determine the travel distance or time from user location 1720 to locations 1702, 1704, 1706, and 1708. Thus, in various embodiments, example 1700 may be a distance plot (e.g., map), travel time plot, and/or a combination of both of how far or how much time is needed for the user to pick-up items for relationship based fulfillment from various locations.

The platform and/or machine learning techniques (e.g., based on data received for travel time from users of the platform) may determine that location 1702 is within distance/time zone 1710 and, thus, a minor inconvenience to the user based on the user's daily schedule. It may also determine that locations 1706 and 1708 are within distance/time zone 1712 and, thus, a moderate inconvenience to the user based on the user's daily schedule. It may further determine that location 1704 is within distance/time zone 1714 and, thus, a major inconvenience to the user based on the user's daily schedule. In certain embodiments, a score may be assigned based on the determined inconvenience (e.g., 1 for minor inconvenience, 2 for moderate inconvenience, and 3 for major inconvenience). In certain embodiments, some such scores may be disqualifying. Thus, for example, a determination of major inconvenience (e.g., based on current detected conditions such as traffic conditions, according to the techniques described herein) may disqualify the user from performing the associated fulfillment.

FIG. 18 illustrates an example of delivery disturbance score determination, in accordance with some embodiments. FIG. 18 illustrates an example of determining a level of delivery inconvenience to a user for performing relationship based fulfillment. In example 1800, user location 1820 may be a location of the user along a predicted route of the user. In various embodiments, user location 1820 may be a current location of a user or may be a predicted location of a user at some future time during travel along a route (e.g., based on machine learning of the schedule of the user). Similar to example 1700, in example 1800, in embodiments where user location 1820 is a predicted location, such a location may be fluid (e.g., along any portion of a forecasted route of the user). The distances from user location 1820 to pick-up locations 1802, 1804, 1806, and 1808 may thus be a relative distance from determined closest or most convenient (e.g., shortest amount of travel time) points along the determined route of the user.

Example 1800 may determine the convenience of delivery for the user from user location 1820 to locations 1802, 1804, 1806, and 1808. As will be appreciated, though user location 1820 (as well as user location 1720) are shown as one location in example 1800 (and example 1700), in reality, user location 1820 may be associated with different locations for the fulfilment provided for each example fulfillment request associated with locations 1802, 1804, 1806, and 1808. As such, the distance traveled may have different starting points for each of the examples associated with locations 1802, 1804, 1806, and 1808, (as well as locations 1702, 1704, 1706, and 1708) though it is shown as the same starting location in example 1800 (as well as example 1700). For example, user location 1820 may correspond to the respective pick-up locations for the items associated with delivery to locations 1802, 1804, 1806, and 1808 or may correspond to how far out the user needs change the user's normal schedule in order to deliver to locations 1802, 1804, 1806, and 1808. As such, example 1800 may be a distance plot (e.g., map), travel time plot, and/or a combination of both of how far or how much time is needed for the user to deliver items for relationship based fulfillment from various locations.

In certain embodiments, the platform (e.g., utilizing machine learning) may be determine optimal pick-up times for the user providing relationship based fulfillment. Thus, for example, the platform may receive data allowing for the determination of the volume of orders at the merchant. The platform may determine pick-up times that minimize the amount of time that the user spends within the merchant's establishment (e.g., based on the merchant being less busy during those times and/or experiencing downtime). The platform may indicate those times to the user.

The platform and/or machine learning techniques (e.g., based on data received for travel time from users of the platform) may determine that delivery to location 1806 is within distance/time zone 1810 and, thus, a minor inconvenience, delivery to locations 1802 and 1804 are within distance/time zone 1812 and, thus, a moderate inconvenience, and that delivery to location 1808 is within distance/time zone 1814 and, thus, a major inconvenience. In certain embodiments, a score may be assigned based on the determined inconvenience (e.g., 1 for minor inconvenience, 2 for moderate inconvenience, and 3 for major inconvenience). In certain embodiments, some such scores may be disqualifying. Thus, for example, a determination of major inconvenience may disqualify the user from performing the associated fulfillment.

FIG. 19 illustrates an example of connection score determination, in accordance with some embodiments. Example 1900 illustrates social connections between a potential relationship based fulfillment user 1920 and various requesting users 1902, 1904, 1906, and 1908. Thus, for example, requesting user 1902 may be a $3^{rd}$ level of connection from user 1920, requesting users 1904 and 1908 may be $1^{st}$ degrees of connection from user 1920, and requesting user 1906 may be a $2^{nd}$ degree of connection from user 1920. In certain embodiments, a score may be assigned based on the determined level of connection between user 1920 and the requesting users 1902, 1904, 1906, and 1908.

In certain embodiments, all three determinations of examples 1700, 1800, and 1900 may be performed for a user in response to a request for relationship based fulfillment. Thus, 1702, 1802, and 1902 may be associated with the same requesting user. Similarly, 1704, 1804, and 1904 may be associated with the same requesting user, 1706, 1806, and 1906 may be associated with the same requesting user, and 1708, 1808, and 1908 may be associated with the same requesting user. A total score, associated with the inconvenience of the relationship based fulfillment and the motivation for the candidate user to perform the relationship based fulfillment (e.g., based on the degree of connection between the candidate user and the requesting user) may be accordingly determined. Thus, for example, a combined score that includes the scores determined in examples 1700$s$, 1800$s$, and 1900$s$ may be determined. In a certain embodiment, such an example score may include the inconvenience scores determined in examples 1700 and/or 1800 as well as a score associated with the degree of connection (e.g., a numerical score corresponding to the degree of connection). The combined score may be summed or otherwise determined (e.g., through a formula incorporating the scores as inputs) and output.

In certain embodiments, a lower score may indicate a relationship based fulfillment opportunity that is more attractive to a user. For embodiments where the scores are summed, such a score may be, for example, 6 (based on 1, 2, and 3 in examples 1700-1900) for the request associated with 1702-1902, 6 (based on 3, 2, and 1 in examples 1700-1900) for the request associated with 1704-1904, 5 (based on 2, 1, and 2 in examples 1700-1900) for the request associated with 1706-1906, and 6 (based on 2, 3, and 1 in examples 1700-1900) for the request associated with 1708-1908. In certain such embodiments, certain requests may be disqualified based on inconvenience and/or degree of connection. Thus, for example, the requests associated with 1704-1904 and 1708-1908 may be disqualified due to their inconvenience in pick-up or delivery, as described herein. In certain embodiments, any potential relationship based fulfillment candidate user may require a score below the threshold score in order to have the relationship based fulfillment opportunity provided to the user. In certain embodiments, such a score may include one, some, or all of the factors described herein.

Figure 20:
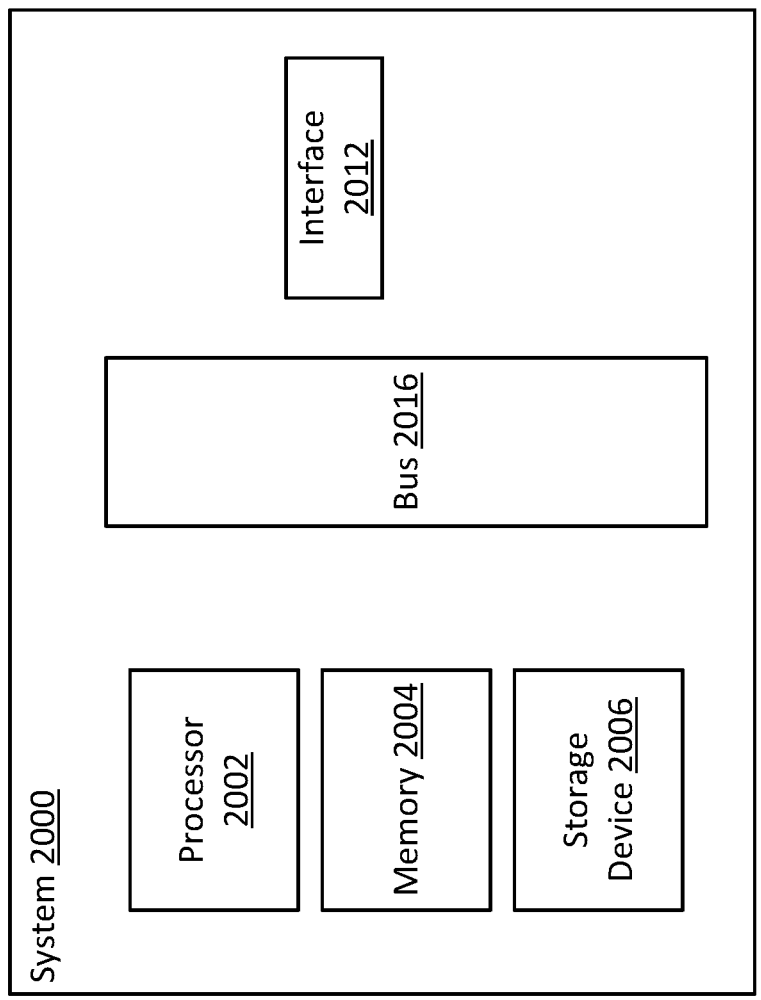
FIG. 20 illustrates a block diagram of an example computing system, in accordance with some embodiments.

FIG. 20 illustrates a block diagram of an example computing system, in accordance with some embodiments. According to various embodiments, a system 2000 suitable for implementing embodiments described herein includes a processor 2002, a memory module 2004, a storage device 2006, an interface 2012, and a bus 2016 (e.g., a PCI bus or other interconnection fabric.) System 2000 may operate as variety of devices such as a server system such as an application server and a database server, a client system such as a laptop, desktop, smartphone, tablet, wearable device, set top box, etc., or any other device or service described herein.

Although a particular configuration is described, a variety of alternative configurations are possible. The processor 2002 may perform operations such as those described herein. Instructions for performing such operations may be embodied in the memory 2004, on one or more non-transitory computer readable media, or on some other storage device. Various specially configured devices can also be used in place of or in addition to the processor 2002. The interface 2012 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Figure 21:
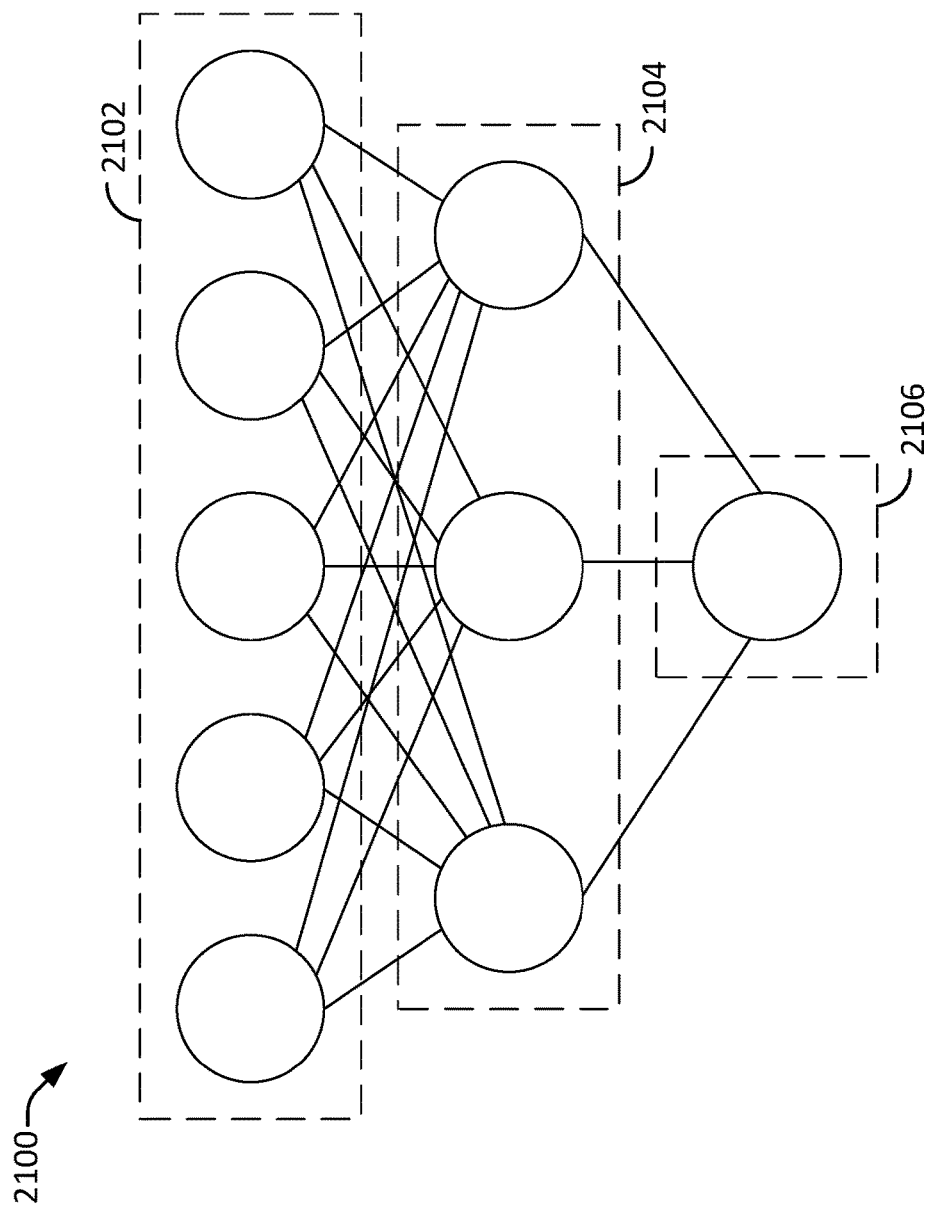
FIG. 21 illustrates an example of a neural network, configured in accordance with some embodiments.

FIG. 21 illustrates an example of a neural network, configured in accordance with some embodiments. FIG. 21 illustrates a neural network 2100 that includes input layer 2102, hidden layers 2104, and output layer 2106. Neural network 2100 may be a machine learning network that may be trained to perform the techniques described herein (e.g., determining a predicted location of a user and/or providing location groups for the user).

Neural network 2100 may be trained with inputs. Input layer 2102 may include such inputs. Such inputs may include, for example, social contacts of the user, location data of the user, groups associated with the user, and/or other such data described herein. Hidden layers 2104 may be one or more intermediate layers where logic is performed to determine various aspects of the data (e.g., determination of appropriate groups for the user). Output layer 2106 may result from computation performed within hidden layers 2104 and may output, for example, recommended groups, predicted locations, likelihood of acceptance of requests for relationship based fulfillment, and/or other such outputs.

Machine learning may be utilized to determine parameters (e.g., association groups, geofences, daily routines, and/or other such parameters) of the techniques described herein and/or to perform the techniques themselves. In various embodiments, machine learning may continuously or periodically refine the determinations based on data received (e.g., additional location data received).

Any of the disclosed embodiments may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various embodiments have been described herein, it should be understood that they have been presented by way of example only, and not limitation. For example, some techniques and mechanisms are described herein in the context of fulfillment. However, the disclosed techniques apply to a wide variety of circumstances. Particular embodiments may be implemented without some or all of the specific details described herein. In other instances, well known process operations have not been described in detail in order not to unnecessarily obscure the techniques disclosed herein. Accordingly, the breadth and scope of the present application should not be limited by any of the embodiments described herein, but should be defined only in accordance with the claims and their equivalents.

The invention claimed is:

1. A system for relationship based fulfillment wherein deliveries are compensated and regulated by the system to encourage participation by users, the system comprising:
   a communication gateway, electronically coupled to a network, wherein the system is in electronic communication via the network with mobile computing devices of merchants and users;
   a location module, configured to receive location data from an application installed on user mobile computing devices of user members;
   a coin module controlled by the system, the coin module configured to store a coin blockchain and a coin ledger associated with a coin, wherein the coin comprises a cryptocurrency platform coin exclusively regulated by the system and configured to be used for transactions and exchanges on the system to reduce system processing resources; and
   a processor, communicatively coupled to the gateway, the location module, and the coin module, the processor configured to perform operations comprising:
      receiving, with the gateway and from a first user device associated with a first user, a first fulfillment request associated with a first transaction, wherein the first fulfillment request comprises a standardized coin compensation of a platform coin;
      determining, with the processor, a first geofence around a first pick-up location;
      matching, with the processor, a second user to the first fulfillment request, wherein the second user is associated with a second user device, and wherein the matching the second user to the first fulfillment request comprises:
         determining, with the location module and from a second user device associated with a second user, current second user location data, generated by a GPS device of the second user device, indicating a current location of the second user device; and
         determining, with the processor, that the current second user location is within the first geofence;
      receiving, with the gateway, a first fulfillment acceptance from the second user device;
      determining, with the processor, that the first fulfillment acceptance indicates the standardized coin compensation;
      providing, with the gateway to the second user device, first pick-up data comprising a first token comprising the first fulfillment request;
      receiving, with the gateway from the second user device, completion data comprising a first updated token, wherein the first updated token includes the first fulfillment request and a completion indication;
      determining, with the processor from the first updated token, that the first fulfillment request has been performed;
      allocating, with the coin module on the coin ledger and based on the determining that the first fulfillment request has been performed, the standardized coin compensation to the second user;
      recording, with the coin module and based on the first fulfillment acceptance indicating the standardized coin compensation, a blockchain record event;
      receiving, with the gateway and from the first or second user, an exchange request for a first coin amount of the platform coin;
      providing, with the gateway to an exchange engine and based on receiving the exchange request, an exchange rate request, wherein the exchange engine comprises a marketplace for users to exchange or transact the platform coin for other currencies;
      receiving, with the gateway, exchange rate data;
      determining, with the coin module and based on the exchange rate data, an exchange rate for the exchange of the first coin amount of the platform coin;
      comparing, with the coin module, the exchange rate with a threshold rate;
      determining, with the coin module, that the exchange rate is below the threshold rate;
      providing, with the gateway and based on the determining that the exchange rate is below the threshold rate, a backstop request to a backstop entity, wherein the threshold rate comprises a minimum exchange rate to encourage users to participate in the system;
      receiving, with the gateway and from the backstop entity, a backstop confirmation indicating an agreement for an exchange of the first coin amount of the platform coin between the first or second user and the backstop entity at the threshold rate;
      recording, on the coin ledger, the exchange based on the exchange request;
      determining, with the processor and based on the receiving the backstop confirmation, that the blockchain record event has been satisfied; and
      generating, with the coin module, a coin record associated with the exchange between the second user and the backstop entity at the threshold rate.

2. The system of claim 1, wherein the first fulfillment request is associated with the first pick-up location and a first drop-off location.

3. The system of claim 2, wherein the exchange rate request is a second exchange rate request, the exchange rate data is second exchange rate data, the exchange rate is a second exchange rate, and wherein the operations further comprise:
   providing, with the gateway to the exchange engine, a first exchange rate request;

receiving, with the gateway, first exchange rate data;
determining, with the coin module and based on the first exchange rate data, a first exchange rate for the platform coin; and
determining, with the processor based on the first exchange rate, a size of a first geofence around the first pick-up location.

4. The system of claim 3, further comprising:
a user database, configured to store user data associated with the user members; and
a machine learning module, communicatively coupled to the location module and the user database, the machine learning module configured to perform a technique comprising:
periodically receiving, with the location module and from the second user device, periodic second user location data, generated by a global positioning system (GPS) device of the second user device;
determining, with the machine learning module and based on the periodic second user location data, a second user regular routes and locations; and
providing, by the machine learning module to the user database, the second user regular routes and locations for storage within the user database.

5. The system of claim 4, wherein the matching the second user to the first fulfillment request further comprises:
accessing, with the processor, the second user regular routes and locations stored within the user database to determine that the first drop-off location is within a threshold distance of at least a portion of the second user regular routes and locations.

6. The system of claim 5, wherein the matching the second user to the first fulfillment request further comprises:
determining, with the processor and based on the first exchange rate, the current second user location data and the second user regular routes and locations, a second user geofence; and
determining, with the processor, that the first pick-up location is within the second user geofence.

7. The system of claim 6, wherein the allocating comprises:
determining, with the processor, details of completion of the first fulfillment request from the first updated token; and
updating, with the processor, the coin ledger with the details of the completion of the first fulfillment request.

8. The system of claim 6, wherein the allocating comprises:
providing the first updated token to the coin ledger.

9. A method comprising:
receiving, with a gateway and from a first user device associated with a first user, a first fulfillment request associated with a first transaction, wherein the first fulfillment request comprises a standardized coin compensation of a platform coin;
determining, with a processor, a first geofence around a first pick-up location;
matching, with the processor, a second user to the first fulfillment request, wherein the second user is associated with a second user device, and wherein the matching the second user to the first fulfillment request comprises:
determining, with a location module and from a second user device associated with a second user, current second user location data, generated by a GPS device of the second user device, indicating a current location of the second user device; and
determining, with the processor, that the current second user location is within the first geofence;
receiving, with the gateway, a first fulfillment acceptance from the second user device;
determining, with the processor, that the first fulfillment acceptance indicates the standardized coin compensation;
providing, with the gateway to the second user device, first pick-up data comprising a first token comprising the first fulfillment request;
receiving, with the gateway from the second user device, completion data comprising a first updated token, wherein the first updated token includes the first fulfillment request and a completion indication;
determining, with the processor from the first updated token, that the first fulfillment request has been performed;
allocating, with a coin module on a coin ledger and based on the determining that the first fulfillment request has been performed, the standardized coin compensation to the second user;
recording, with a coin module and based on the first fulfillment acceptance indicating the standardized coin compensation, a blockchain record event;
receiving, with the gateway and from the first or second user, an exchange request for a first coin amount of the platform coin;
providing, with the gateway to an exchange engine and based on receiving the exchange request, an exchange rate request, wherein the exchange engine comprises a marketplace for users to exchange or transact the platform coin for other currencies;
receiving, with the gateway, exchange rate data;
determining, with the coin module and based on the exchange rate data, an exchange rate for the exchange of the first coin amount of the platform coin;
comparing, with the coin module, the exchange rate with a threshold rate;
determining, with the coin module, that the exchange rate is below the threshold rate;
providing, with the gateway and based on the determining that the exchange rate is below the threshold rate, a backstop request to a backstop entity, wherein the threshold rate comprises a minimum exchange rate to encourage users to participate;
receiving, with the gateway and from the backstop entity, a backstop confirmation indicating an agreement for an exchange of the first coin amount of the platform coin between the first or second user and the backstop entity at the threshold rate;
recording, on the coin ledger, the exchange based on the exchange request;
determining, with the processor and based on the receiving the backstop confirmation, that the blockchain record event has been satisfied; and
generating, with the coin module, a coin record associated with the exchange between the second user and the backstop entity at the threshold rate.

10. The method of claim 9, wherein the first fulfillment request is associated with the first pick-up location and a first drop-off location.

11. The method of claim 10, wherein the exchange rate request is a second exchange rate request, the exchange rate data is second exchange rate data, the exchange rate is a second exchange rate, and wherein the method further comprises:

providing, with the gateway to the exchange engine, a first exchange rate request;

receiving, with the gateway, first exchange rate data;

determining, with the coin module and based on the first exchange rate data, a first exchange rate for the platform coin; and determining, with the processor based on the first exchange rate, a size of a first geofence around the first pick-up location.

12. The method of claim 11, further comprising:

periodically receiving, with the location module and from the second user device, periodic second user location data, generated by a global positioning system (GPS) device of the second user device;

determining, with a machine learning module and based on the periodic second user location data, a second user regular routes and locations; and providing, by the machine learning module to a user database, the second user regular routes and locations for storage within the user database.

13. The method of claim 12, wherein the matching the second user to the first fulfillment request further comprises:

accessing, with the processor, the second user regular routes and locations stored within the user database to determine that the first drop-off location is within a threshold distance of at least a portion of the second user regular routes and locations.

14. The method of claim 13, wherein the matching the second user to the first fulfillment request further comprises:

determining, with the processor and based on the first exchange rate, the current second user location data and the second user regular routes and locations, a second user geofence; and determining, with the processor, that the first pick-up location is within the second user geofence.

15. The method of claim 14, wherein the allocating comprises:

determining, with the processor, details of completion of the first fulfillment request from the first updated token; and updating, with the processor, the coin ledger with the details of the completion of the first fulfillment request.

16. The method of claim 14, wherein the allocating comprises:

providing the first updated token to the coin ledger.

\* \* \* \* \*